United States Patent
Nakagawa et al.

(10) Patent No.: US 6,782,694 B2
(45) Date of Patent: Aug. 31, 2004

(54) METHOD AND APPARATUS FOR CONTROLLING AN ENGINE

(75) Inventors: Shinji Nakagawa, Hitachinaka (JP); Minoru Ohsuga, Hitachinaka (JP); Masami Nagano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/084,666

(22) Filed: Feb. 28, 2002

(65) Prior Publication Data

US 2003/0136113 A1 Jul. 24, 2003

(30) Foreign Application Priority Data

Jan. 18, 2002 (JP) ........................................ 2002-009385

(51) Int. Cl.[7] .................................................. F01N 3/00
(52) U.S. Cl. ............................ 60/285; 60/274; 60/286; 60/295; 60/297; 60/300
(58) Field of Search ......................... 60/274, 285, 295, 60/297, 300, 301, 286

(56) References Cited

U.S. PATENT DOCUMENTS

| | | | | |
|---|---|---|---|---|
| 5,517,820 A | * | 5/1996 | Kuroda et al. ................. | 60/274 |
| 5,996,338 A | * | 12/1999 | Hirota ......................... | 60/285 |
| 6,173,571 B1 | * | 1/2001 | Kaneko et al. ............... | 60/286 |
| 6,212,885 B1 | * | 4/2001 | Hirota et al. ................. | 60/288 |
| 6,220,018 B1 | * | 4/2001 | Yamanashi et al. ........... | 60/285 |
| 6,233,925 B1 | * | 5/2001 | Hirota et al. ................. | 60/285 |
| 6,314,935 B2 | * | 11/2001 | Tanaka et al. ............... | 123/298 |
| 6,367,246 B1 | * | 4/2002 | Hirota et al. ................. | 60/295 |
| 6,487,851 B1 | * | 12/2002 | Okada et al. ................. | 60/285 |

FOREIGN PATENT DOCUMENTS

| | | |
|---|---|---|
| JP | 4-230561 | 8/1992 |
| JP | 5-79319 | 3/1993 |

* cited by examiner

*Primary Examiner*—Binh Q. Tran
(74) *Attorney, Agent, or Firm*—McDermott Will & Emery LLP

(57) ABSTRACT

A control method of an engine including at least an HC adsorbing catalyst for adsorbing HC at a low temperature, and emitting adsorbed HC at a high temperature, and a three-way purifying function on the same carrier, and an $NO_x$ adsorbing catalyst having an $NO_x$ adsorbing function for adsorbing or occluding $NO_x$ in oxidizing atmosphere, and emitting $NO_x$ in reducing atmosphere, and a three-way purifying function. The engine operated with stoichiometric value or a rich air-fuel when a temperature of the HC adsorbing catalyst and/or a temperature of the $NO_x$ adsorbing catalyst is equal to/lower than a predetermined value. The engine is operated with a lean air-fuel ratio when a temperature of the HC adsorbing catalyst and/or a temperature of the $NO_x$ adsorbing catalyst is equal to/higher than the predetermined value.

17 Claims, 35 Drawing Sheets

<FUEL INJECTION QUANTITY CALCULATION UNIT>

<FUEL INJECTION QUANTITY CORRECTION UNIT>

<TARGET AIR QUANTITY CALUCLATION UNIT>

ACTUAL AIR QUANTITY CALCULATION UNIT

<TARGET THROTTLE OPENING CALCULATION UNIT>

<THROTTLE OPENING CONTROL DEVICE>

<IGNITION TIMING CALCULATION UNIT>

FIG. 19
<TARGET EQUIVALENT RATIO CALCULATION UNIT>
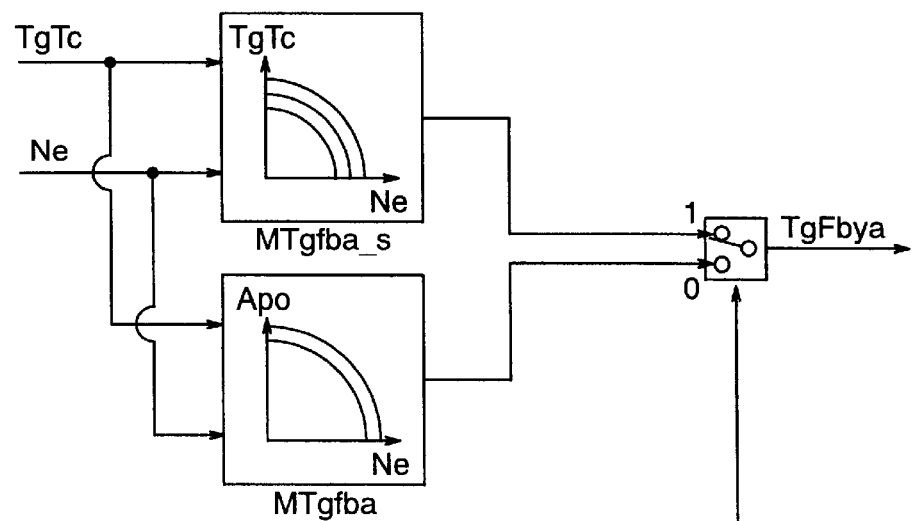
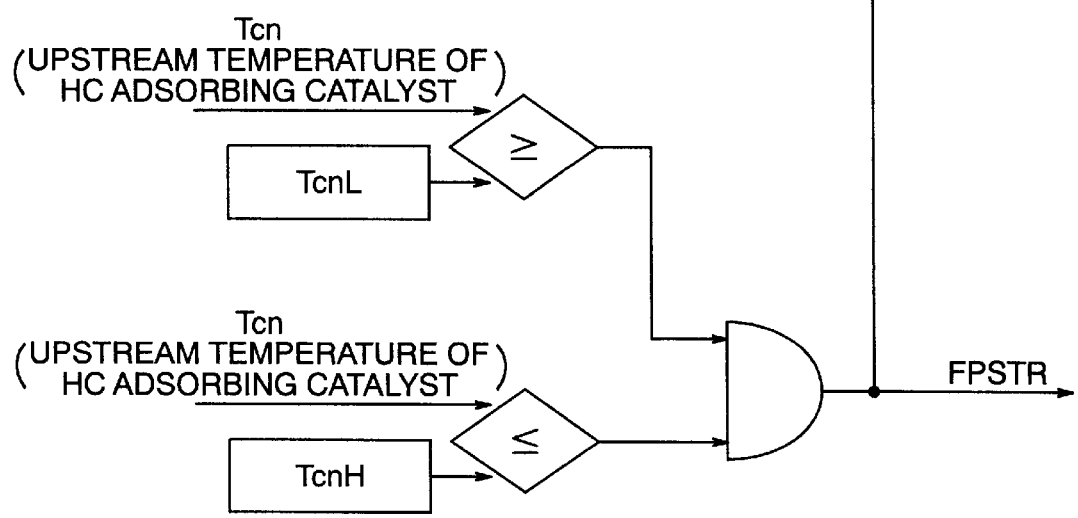

FIG. 29
<FUEL INJECTION QUANTITY CALCULATION UNIT>
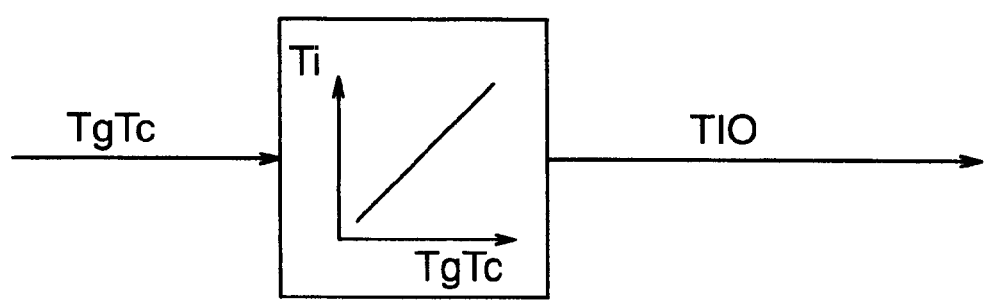
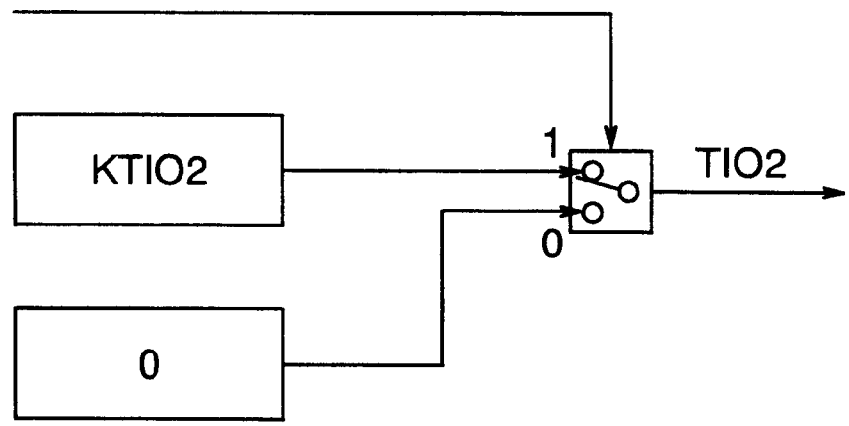

METHOD AND APPARATUS FOR CONTROLLING AN ENGINE

BACKGROUND OF THE INVENTION

The present invention relates to an exhaust emission control system of an engine and, more particularly, to a method and an apparatus for controlling exhaust emission of a lean burn engine, which enables combustion to be carried out in a wide range of air-fuel ratios.

Recently, a low fuel consumption type engine has been requested even for an automobile along the lines of worldwide efforts for energy conservation.

Various types have been presented for low fuel consumption engines. The lean burn engine using a so-called wide range of air-fuel ratios is representative one of such engines, which is designed to improve fuel economy by burning a lean mixture having a larger ratio of air compared to a ratio of fuel. Generally, a low fuel consumption engine is achieved by modifying an intake port injection engine.

In addition, as another lean burn engine using a wide range of air-fuel ratios, there has been developed an engine, which has an overall air-fuel ratio increased to about 40 by directly injecting fuel into cylinders of the engine so as to generate a stratified charged mixture in the cylinder.

On the other hand, different from the above-described viewpoint of fuel economy, because of environmental problems such as global warming, a strong request has similarly made of achievement of a low exhaust emission engine designed to reduce harmful components in exhaust gas emitted from the engine. In the individual countries of the world, own exhaust gas emission control regulations have been in practice.

To pass such an exhaust gas emission control regulation, it is important to reduce carbon monoxide (CO), nitrogen oxide ($NO_x$) and unburned hydrocarbon (HC). At present, such harmful exhaust components are controlled by a catalyst called a three-way catalyst.

However, to pass a strict exhaust gas emission control regulation by further reducing the harmful exhaust components, a reduction in harmful exhaust components generated before the three-way catalyst is activated at the time of starting is a big problem, especially a reduction in HC.

As one of effective means for reducing HC before the activation of the three-way catalyst, there has been available a system of using an HC adsorbing catalyst. For the HC adsorbing catalyst, a system filled with a catalyst having an HC adsorbing function and a three-way purifying function provided on the same catalyst bed, or a system using both a catalyst bed having an HC adsorbing function and a separate catalyst bed having a three-way purifying function may be employed.

The former catalyst having the HC adsorbing function and the three-way purifying function includes precious metals having an HC adsorbing function and a three-way purifying function carried by the same carrier. In this case, HC discharged from the engine at a low temperature is physically or electrically adsorbed, and the HC eliminated following an increase in a temperature of the catalyst is subjected to oxidation control by using the precious metal having the three-way purifying function carried in the same catalyst.

However, to efficiently control the eliminated HC, sufficient oxygen must be supplied to oxidize the eliminated HC.

On the other hand, in the case of the latter HC adsorbing catalyst, heat resistance of an adsorption material is low. Accordingly, disposition of the catalyst directly below the engine increased to a high temperature by exhaust gas is not preferable, and the three-way catalyst is activated early by using heat of high-temperature exhaust gas. For such reasons, the three-way catalyst is often disposed in a position, where a high temperature of exhaust gas on the upstream side of the HC adsorbing catalyst.

However, in the case of disposing the three-way catalyst on the upstream side of the HC adsorbing catalyst, as shown in FIG. 5, oxygen much contained at an engine outlet is consumed by HC and CO oxidation reaction of the three-way catalyst. Consequently, concentration of oxygen at an inlet of the HC adsorbing catalyst tends to be lowered as indicated by an arrow.

Thus, to efficiently control the HC eliminated from the HC adsorbing catalyst, it is necessary to feed sufficient oxygen into the HC adsorbing catalyst by greatly shifting an air-fuel ratio of the engine to a lean side (lean mixture side).

However, if the air-fuel ratio is shifted to the lean side, another problem occurs. That is, as shown in FIG. 6, $NO_x$ control efficiency of the three-way catalyst is suddenly decreased from a point C, making it impossible to efficiently control $NO_x$.

Against such a background, several methods haven now been presented to efficiently control HC adsorbed by the HC adsorbing catalyst.

For example, according to a technology described in JP-A-4-230561, eliminated HC is efficiently controlled with a three-way catalyst by controlling an air-fuel ratio to a lean side by fuel control with time from a start of elimination in HC elimination.

However, in the above-described technology, because of the adjustment of the air-fuel ratio by the fuel control, there are problems inherent, including deterioration of drivability by great shifting to the lean side, deterioration of $NO_x$ control performance by impossibility of $NO_x$ control with the three-way catalyst caused by shifting to the lean side, and the like.

In addition, JP-A-5-79319 discloses a technology for controlling air necessary for controlling HC by a catalyst.

However, if air enough for controlling HC is supplied to a three-way catalyst, oxidizing atmosphere in the catalyst is increased, possibility causing a reduction in $NO_x$ control efficiency.

SUMMARY OF THE INVENTION

Objects of the present invention are to provide a method and an apparatus for controlling an engine, capable of efficiently controlling HC at a time of starting without losing $NO_x$ control efficiency and driving stability of the engine.

A first aspect of the present invention is directed to a control method of an engine. This control method of the engine comprises at least an HC adsorbing catalyst having an HC adsorbing function for adsorbing HC in an exhaust gas pipe of the engine at a low temperature and for emitting the adsorbed HC at a high temperature, and a three-way purifying function on the same carrier; and an $NO_x$ adsorbing (occluding) catalyst having an $NO_x$ adsorbing (occluding) function for adsorbing or occluding $NO_x$ in oxidizing atmosphere and for emitting $NO_x$ in reducing atmosphere, and a three-way purifying function. In this case, the method comprises a step of driving the engine by using an air-fuel ratio as a stoichiometric air-fuel ratio or a rich air-fuel ratio when a temperature of the HC adsorbing catalyst and/or a temperature of the $NO_x$ adsorbing (occluding) catalyst is equal to/lower than a predetermined value, or alternatively driving the engine by the air-fuel ratio as a lean air-fuel ratio when the temperature of the HC adsorbing catalyst and/or a temperature of the $NO_x$ adsorbing (occluding) catalyst is equal to/higher than the predetermined value.

A second aspect of the present invention is directed to a control device of an engine. That is, a lean burn engine capable of combustion by a lean air-fuel ratio comprises at least: an HC adsorbing catalyst having an HC adsorbing function for adsorbing HC to an exhaust gas pipe of the engine at a low temperature, and emitting adsorbed HC at a high temperature, and a three-way purifying function on the same carrier; an $NO_x$ adsorbing (occluding) catalyst having an $NO_x$ adsorbing (occluding) function for adsorbing or occluding $NO_x$ in oxidizing atmosphere, and emitting $NO_x$ in reducing atmosphere; and means for directly or indirectly detecting a temperature of the HC adsorbing catalyst and/or a temperature of the $NO_x$ adsorbing (occluding) catalyst. In this case, an engine driving state is controlled based on the temperature of the HC adsorbing catalyst and/or the temperature of the $NO_x$ adsorbing (occluding) catalyst.

Thus, according to the invention having the foregoing aspects, HC discharged from the engine at a starting time is adsorbed by the HC adsorbing catalyst. In order to efficiently control the HC when the HC adsorbing catalyst reaches an HC elimination temperature, lean shifting of a mixture is carried out to supply sufficient oxygen to the HC adsorbing catalyst to control the HC. $NO_x$ uncontrolled by the three-way purifying function of the $NO_x$ adsorbing (occluding) catalyst in oxidizing atmosphere in this case is processed by the $NO_x$ adsorbing (occluding) function. Therefore, it is possible to reduce both HC and $NO_x$ at the starting time.

Other objects, features and advantages of the invention will become apparent from the following description of the embodiments of the invention taken in conjunction with the accompanying drawings.

BRIEF DESCRIPTION OF THE DRAWINGS

FIG. 19 is a diagram illustrating a target equivalent ratio calculation unit.

FIG. 29 is a diagram illustrating a fuel injection quantity calculation unit.

DESCRIPTION OF THE EMBODIMENTS

Next, detailed description will be made of a principle and the preferred embodiments of the present invention with reference to the accompanying drawings.

Figure 1:
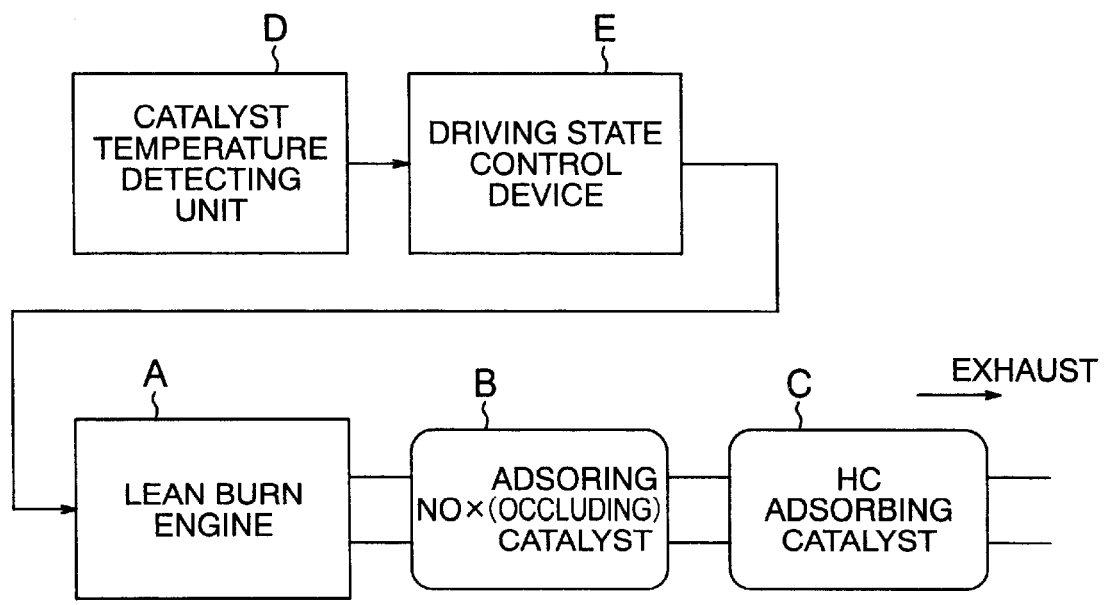
FIG. 1 is a diagram showing a basic configuration of the present invention.

FIG. 1 shows a configuration of a basic system of the present invention. In an engine capable of burning by a wide range of air-fuel ratios, for example, in an exhaust system of a lean burn engine A such as a cylinder injection engine or the like, an $NO_x$ adsorbing (occluding) catalyst B and an HC adsorbing catalyst C are disposed: the catalyst B having an $NO_x$ adsorbing (occluding) function for adsorbing or occluding $NO_x$ under oxidizing atmosphere, and emitting $NO_x$ under reducing atmosphere, and a three-way function; and the catalyst C having an HC adsorbing function for adsorbing HC at a low temperature, and emitting HC at a high temperature, and a three-way function.

In addition, catalyst temperature detecting unit D is provided to directly/indirectly detect a temperature of the HC adsorbing catalyst C and/or a temperature of the $NO_x$ adsorbing (occluding) catalyst B. Then, based on the temperature of the HC adsorbing catalyst and/or the temperature of the $NO_x$ adsorbing (occluding) catalyst detected by this catalyst temperature detecting unit D, fuel, air and other driving parameters are controlled by a driving state control device.

According to such a control device, HC discharged from the engine at a starting time is adsorbed by the HC adsorbing catalyst. In order to efficiently control when the HC adsorbing catalyst reaches an HC elimination temperature, a mixture is shifted to a lean side to supply sufficient oxygen to the HC adsorbing catalyst and control the HC. $NO_x$ not controlled by the three-way purifying function of the $NO_x$ adsorbing (occluding) catalyst under oxidizing atmosphere in this case is processed by the $NO_x$ adsorbing (occluding) function. Thus, both HC and $NO_x$ can be reduced at the starting time.

Figure 39A:
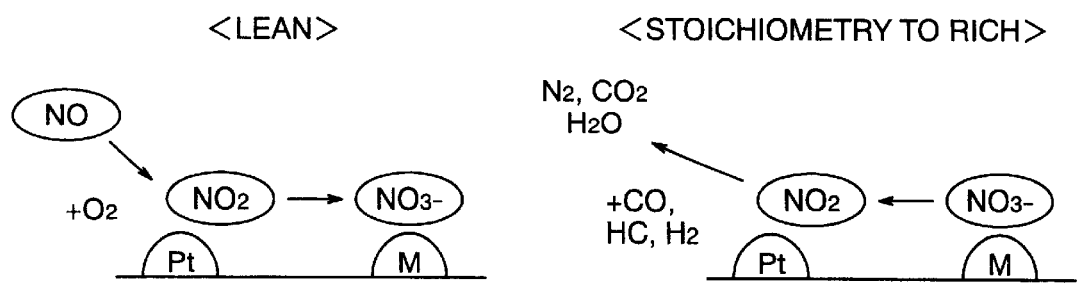
FIGS. 39A and 39B are diagrams illustrating control mechanisms of an $NO_x$ adsorbing (occluding) catalyst and an HC adsorbing catalyst.
Figure 39B:
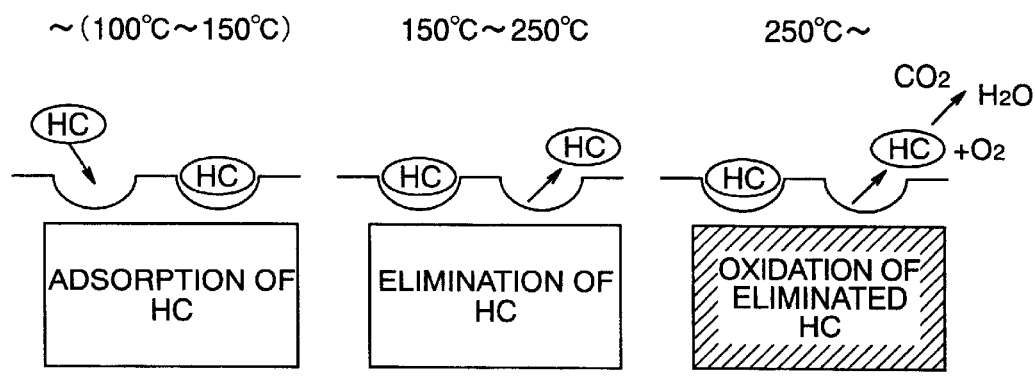

Now, brief description is made of control mechanisms of the $NO_x$ adsorbing (occluding) catalyst B and the HC adsorbing catalyst C by referring to FIGS. 39A and 39B.

FIG. 39A shows the control mechanism of the $NO_x$ adsorbing (occluding) catalyst B. First, in a lean state, NO is oxidized to be $NO_2$ by a precious metal such as Pt, and this $NO_2$ is reacted with an adsorption (occlusion) metal M and fixed. Conversely, in a stoichiometry-rich state, since oxygen is short, a nitrate ion is emitted from the adsorption (occlusion) metal M, and converted into $NO_2$. Then, for control, oxidation/reduction reaction of the $NO_2$ with CO, HC and $H_2$ is promoted.

FIG. 39B shows the control mechanism corresponding to a temperature of the HC adsorbing catalyst C. When a temperature is 100° C. to 150° C. or lower, HC is adsorbed. Elimination of HC that has been adsorbed is started at a temperature of 150° C. to 250° C. At a temperature of 250° or higher, oxidation is further promoted by oxygen contained in exhaust. The above-described temperatures are only for illustrative purposes and, needless to say, changes can be made depending on composition of catalysts.

By the system of the basic configuration using the catalysts having the above-described characteristics, it is possible to highly efficiently control HC to be eliminated in a manner that losses of both $NO_x$ control efficiency and engine driving stability are prevented.

Next, description is made of a modified/applied example of a method for enhancing control performance of the system having the above-described configuration more.

Figure 2:
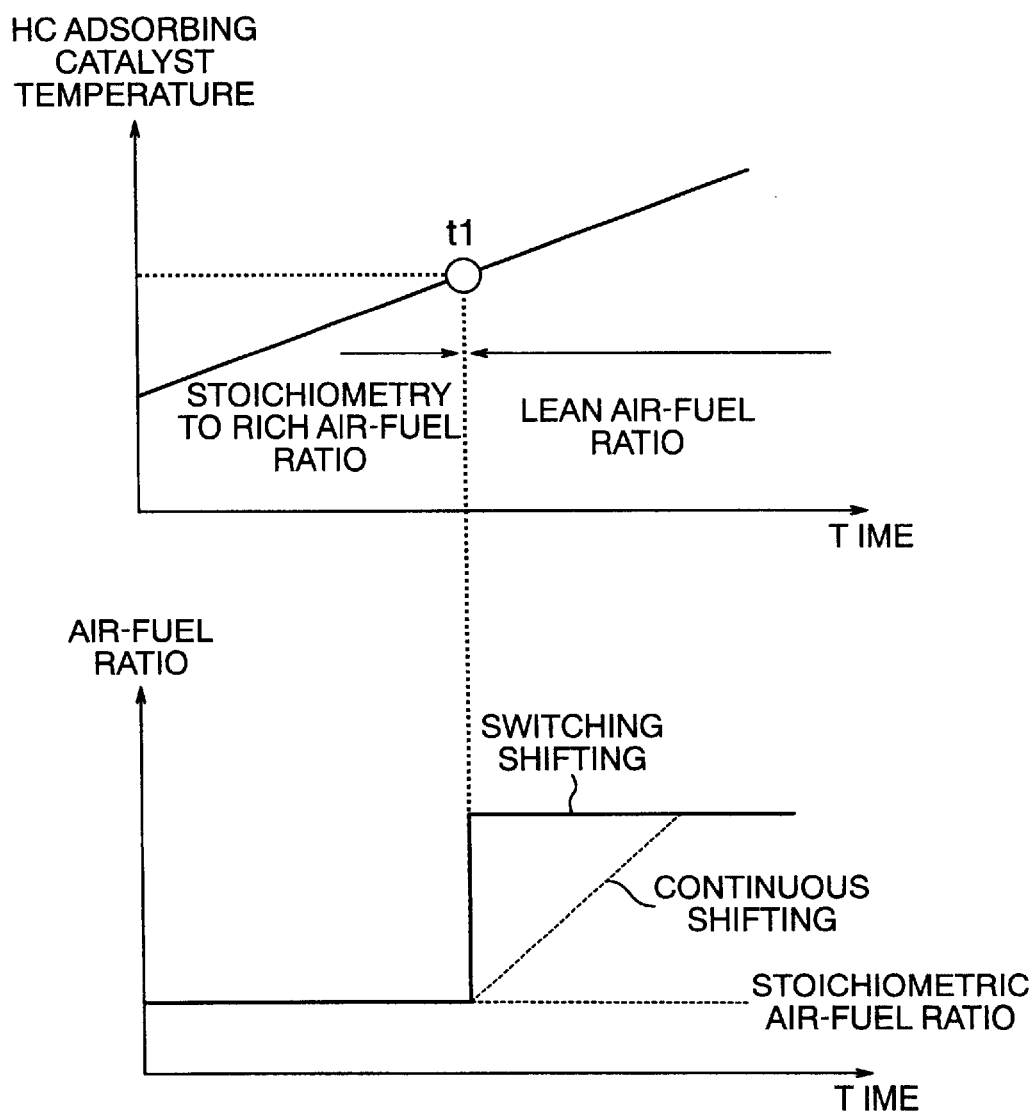
FIG. 2 is a chart illustrating one control state of the invention.

First, as shown in FIGS. 1 and 2, when a temperature of the HC adsorbing catalyst is equal to/higher than a predetermined value t1, it is important to control an air-fuel ratio of the engine to a lean side based on a stoichiometric air-fuel ratio.

That is, because of its characteristics, the HC adsorbing catalyst C adsorbs HC at a temperature of a certain level or lower (generally 100° C. to 150° C.) as shown in FIG. 39B. At a temperature exceeding such a level, control is started by HC elimination and oxidation reaction.

Accordingly, an air-fuel ratio is controlled to a lean side in a switching manner in order to estimate an HC elimination start to monitor a temperature of the HC adsorbing catalyst, and supply oxygen enough to control HC. A state of the air-fuel ratio can be changed in a gradual continuous manner as indicated by a broken line, instead of being changed in a switching manner. In short, what is important is to match the state of the air-fuel ratio with the engine without losing drivability.

Figure 3:
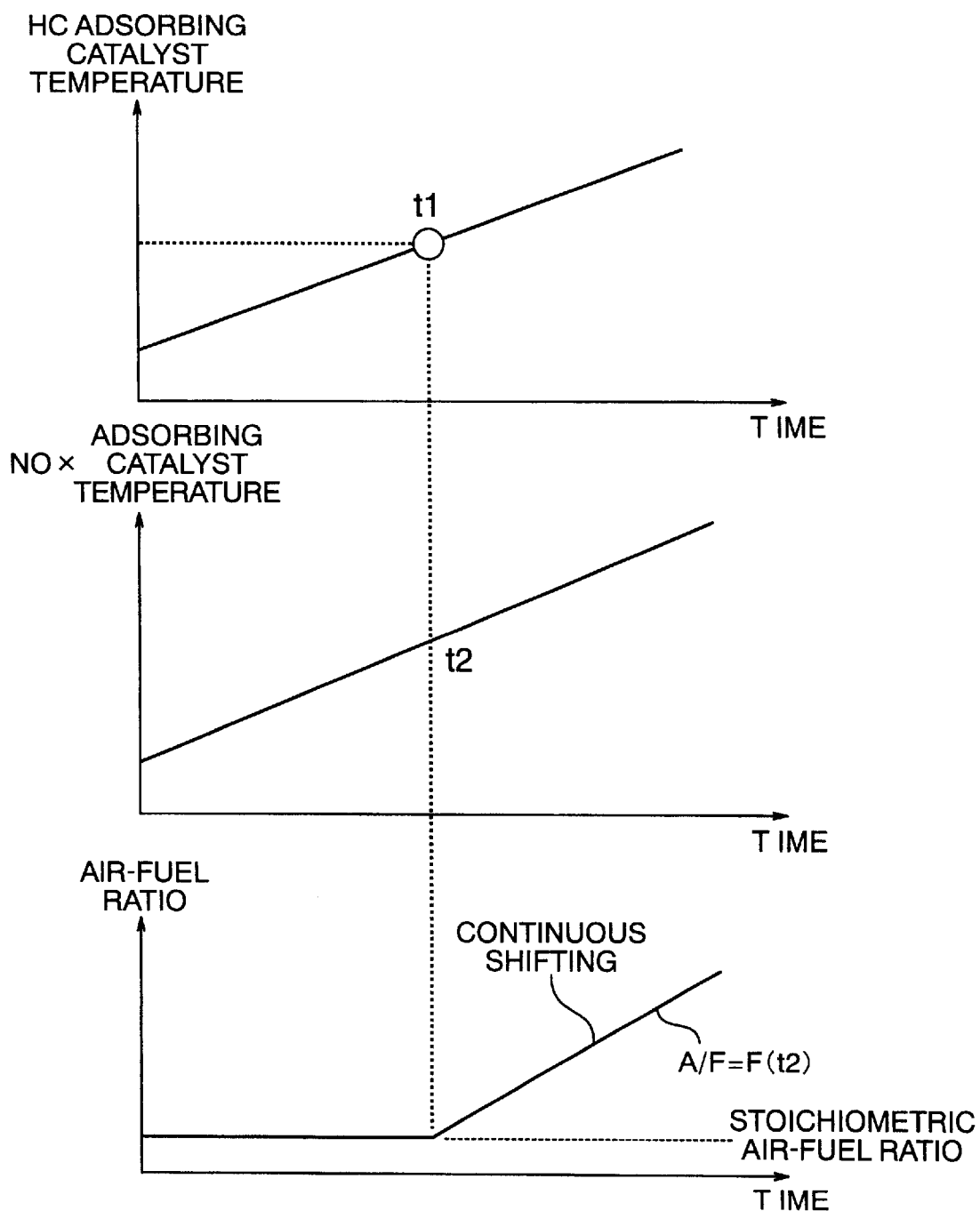
FIG. 3 is a chart illustrating another control state of the invention.

As shown in FIGS. 2 and 3, it is important to detect a temperature t2 of the $NO_x$ adsorbing (occluding) catalyst B when the HC adsorbing catalyst C reaches the predetermined temperature t1 as shown in FIG. 3, and continuously control a quantity of lean shifting in accordance with the temperature of the $NO_x$ adsorbing (occluding) catalyst.

That is, since it is difficult to control $NO_x$ in a lean state by the three-way catalyst, the $NO_x$ adsorbing (occluding) catalyst is separately provided.

$NO_x$ adsorbing (occluding) catalyst B also has a temperature characteristic, and control performance is dependent on a catalyst temperature (generally 300° C. to 500° C.). Thus, it is possible to efficiently control $NO_x$ by detecting a functioning state of the $NO_x$ adsorbing catalyst B based on a temperature, and controlling a quantity of lean shifting to $A/F=f(t2)$ in accordance with temperature dependence if the functioning state is detected.

Elimination of the HC when the HC adsorbing catalyst C reaches the predetermined temperature t1 is estimated. Other than this, the eliminating stat of the HC may be estimated by detecting a temperature of the $NO_x$ adsorbing (occluding) catalyst B.

Thirdly, it is important to control the quantity of lean shifting executed when the temperature of the HC adsorbing catalyst C is equal to/higher than the predetermined temperature t1 such that oxygen concentration at an inlet of each of the HC adsorbing catalyst C and the $NO_x$ adsorbing (occluding) catalyst B can be set equal to the predetermined value or higher.

That is, as described above, in order to HC eliminated from the HC adsorbing catalyst C, sufficient or 0.5% or more oxygen is necessary. However, if a catalyst having a three-way function is present on the downstream side of the HC adsorbing catalyst, oxygen is consumed by this function, thus reducing oxygen on the downstream side.

Thus, it is important to control an air-fuel ratio of the mixture by considering oxygen concentration at the inlet of the HC adsorbing catalyst.

Figure 4:
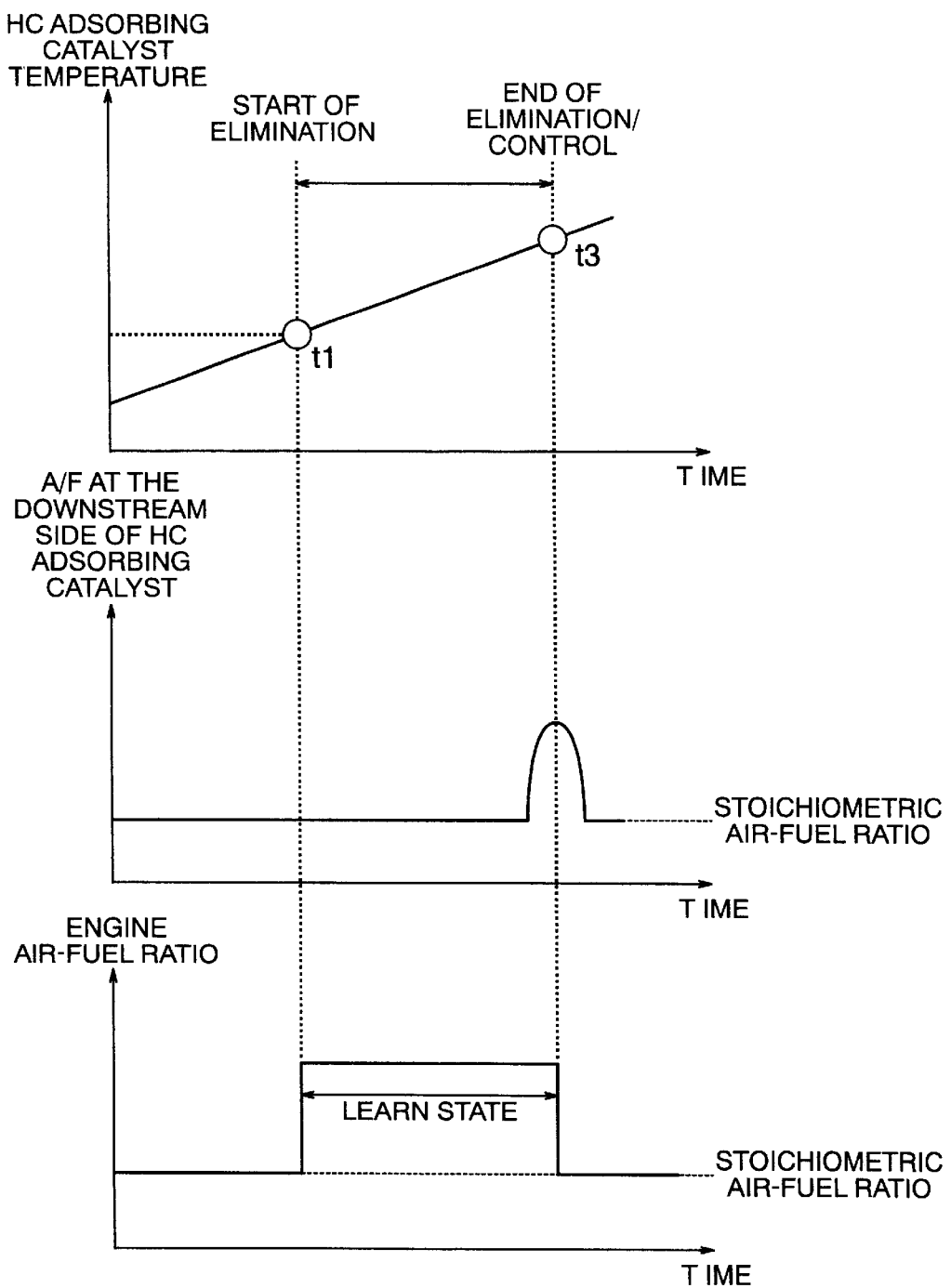
FIG. 4 is a chart showing yet another control state of the invention.
Figure 5:
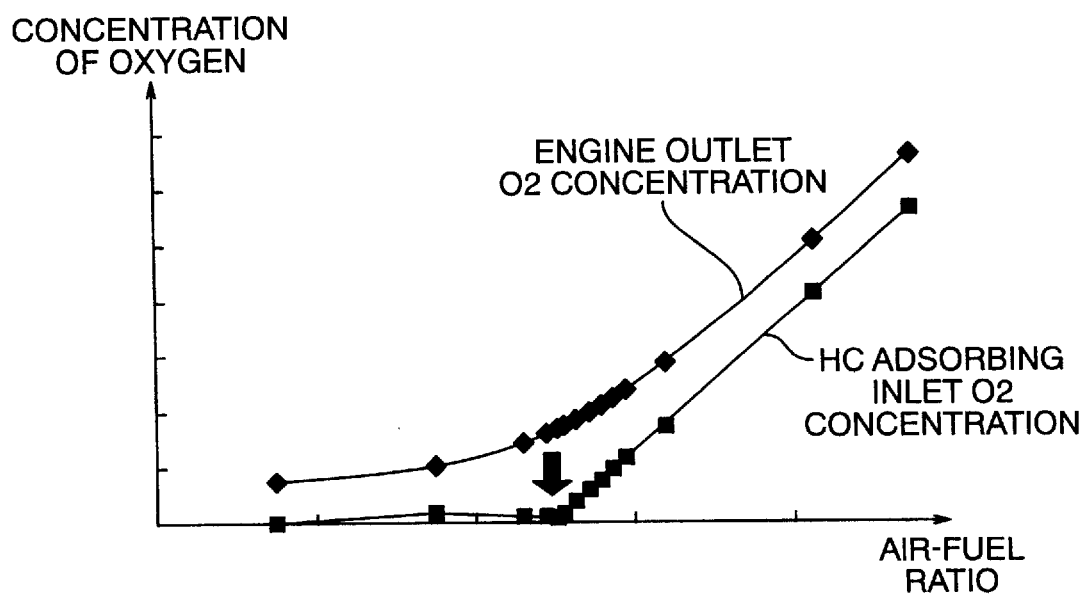
FIG. 5 is a chart showing a relation between an air-fuel ratio and concentration of oxygen before/after a three-way catalyst.
Figure 6:
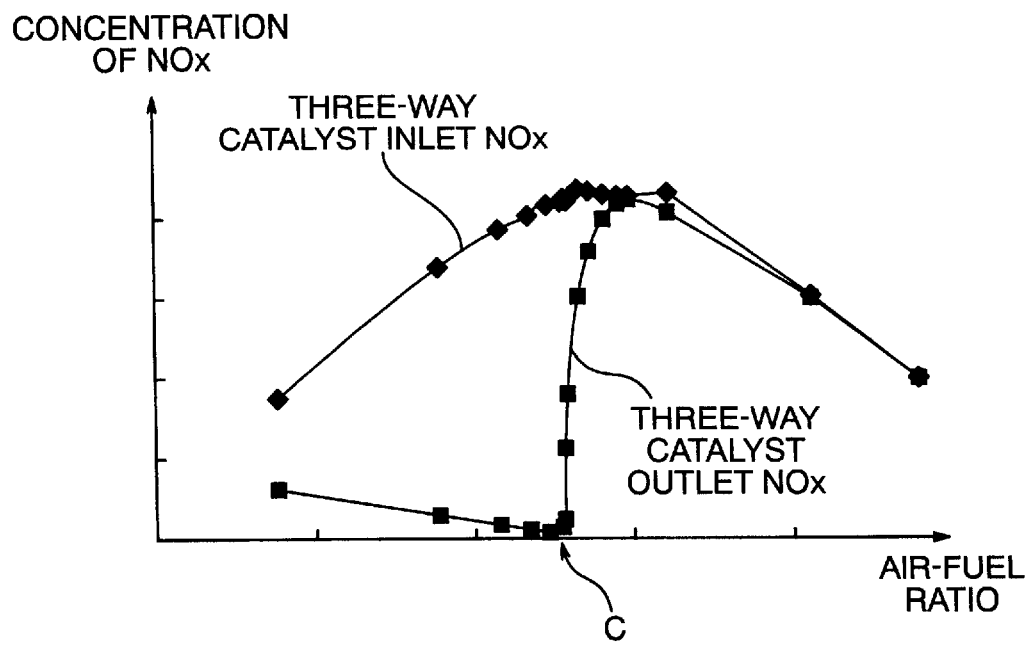
FIG. 6 is a chart showing a relation between an air-fuel ratio and concentration of $NO_x$ before/after a three-way catalyst.

Fourthly, as shown in FIG. 4, it is important to perform lean driving until completion of elimination or control of HC adsorbed by the HC adsorbing catalyst C is directly or indirectly detected, and the HC adsorbed by the HC adsorbing catalyst C is eliminated or controlled.

That is, in order to efficiently control the adsorbed HC, sufficiently oxygen must be supplied at least by lean control until HC elimination is completed. In the example of the invention, by executing lean control until completion of elimination or control of HC, the adsorbed HC can be thoroughly controlled efficiently.

Determination of the completion of the elimination or the control of the HC is made by measuring a temperature t3 of the HC adsorbing catalyst C in FIG. 4. Other than this, determination can be made based on a different in air-fuel ratios between upstream and downstream sides of the HC adsorbing catalyst.

Fifth, it is important to dispose the HC adsorbing catalyst C on the downstream side of the $NO_x$ adsorbing (occluding) catalyst B.

That is, an HC elimination starting temperature of the HC adsorbing catalyst C is lower than an activation temperature for activating the $NO_x$ adsorbing (occluding) catalyst B.

Thus, in the example of the invention, since the lean shifting is designed to be executed when the HC adsorbing catalyst C starts elimination of the adsorbed HC for the purpose of reducing exhaust, the $NO_x$ adsorbing (occluding) catalyst B should preferably in an activated state during the lean shifting.

Thus, to increase a temperature of the $NO_x$ adsorbing (occluding) catalyst B, the $NO_x$ adsorbing (occluding) catalyst B should preferably be disposed on the upstream side of the HC adsorbing catalyst.

Sixth, it is important that driving is carried out by executing lean shifting when a temperature of the HC adsorbing catalyst C is equal to/higher than a predetermined value, and a temperature of the $NO_x$ adsorbing (occluding) catalyst B is equal to/higher than a predetermined value.

That is, the lean shifting is executed to promote oxidation reaction when the adsorbed HC is eliminated from the HC adsorbing catalyst C. In this case, however, if the $NO_x$ adsorbing (occluding) catalyst B is not in an activated state, $NO_x$ cannot exhibit sufficient control performance.

Therefore, for the purpose of reducing $NO_x$, lean shifting control should preferably be performed after activation of the $NO_x$ adsorbing (occluding) catalyst is detected.

As described above, preferably, by adjusting a basic temperature control beforehand based on a catalyst attaching position, a timing of the lean shifting control should be precisely controlled.

Figure 38:
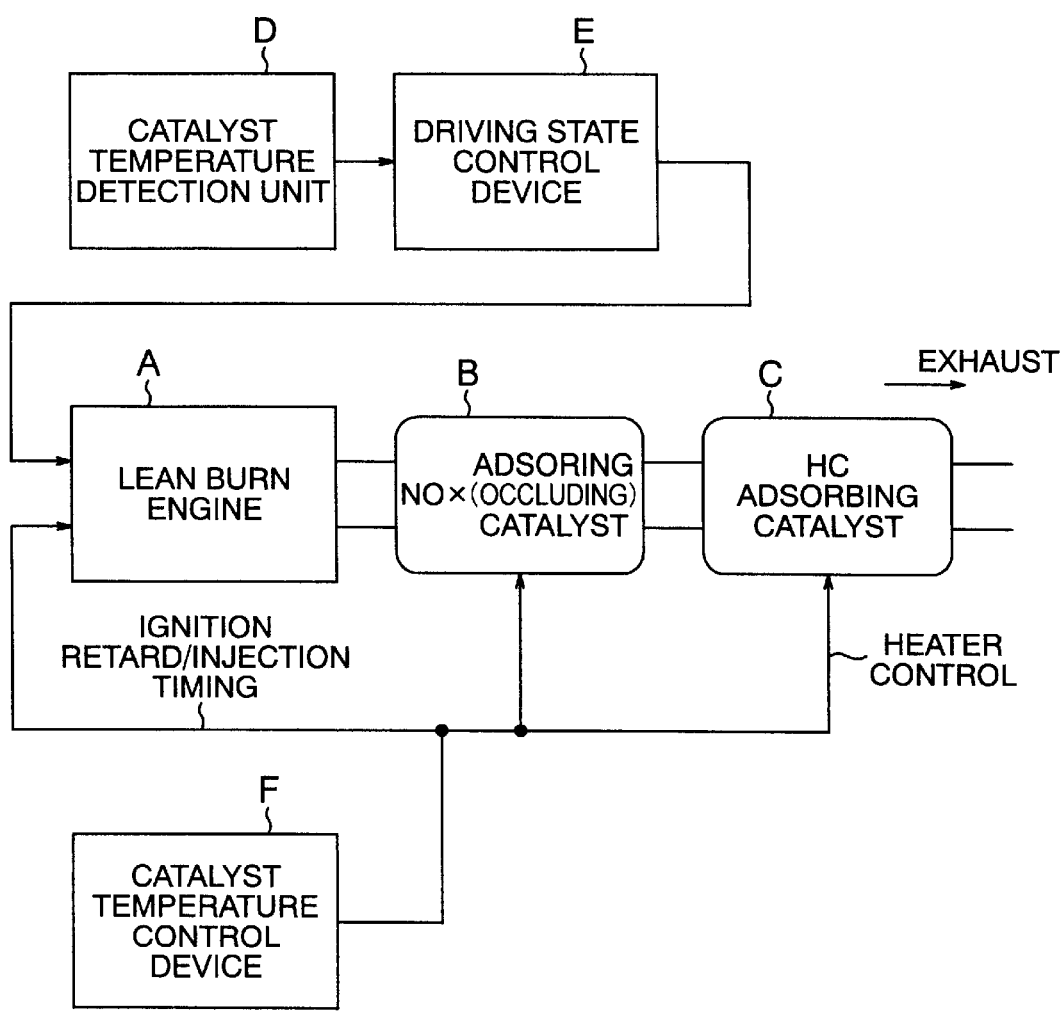
FIG. 38 is a diagram illustrating a system for controlling a temperature of a catalyst.

Seventh, as shown in FIG. 38, as alternative means, it is important to control temperatures of the HC adsorbing catalyst C and the $NO_x$ adsorbing catalyst B themselves by a catalyst temperature control device F.

That is, as described above, the HC adsorbing catalyst C and the $NO_x$ (occlusion) catalyst B have activation temperature characteristics different from each other.

Thus, active temperature control of the catalysts performed to cause both to efficiently function is preferable for the purpose of reducing exhaust. As a specific temperature control method, for example, one may be selected from direct heating of the catalyst by an electric heater, heating by the exhaust gas temperature increased by an ignition timing retard, and heating by after-burning of unburned HC.

In addition, other than the above, for example, in a cylinder injection engine designed to burn fuel by directly injecting it into a cylinder, a catalyst temperature can be increased by injecting fuel in an expansion stroke, and burning (oxidation reaction heat) unburned HC in the cylinder, an exhaust pipe, or the catalyst.

Eighth, as alternative means, it is important that the HC adsorbing catalyst C is disposed on the downstream side of the $NO_x$ adsorbing (occluding) catalyst B, a circulating pipe is provided to circulate exhaust from the downstream side of the HC adsorbing catalyst C to the upstream side of the $NO_x$ adsorbing (occluding) catalyst B, a bypass pipe is provided to discharge exhaust from the downstream side of the $NO_x$ adsorbing (occluding) catalyst B to atmosphere without going through the HC adsorbing catalyst C, and the respective pipes are selected based on catalyst temperatures.

That is, as described above, the HC adsorbing catalyst C should preferably be disposed on the downstream side of the $NO_x$ adsorbing (occluding) catalyst B from the viewpoint of the temperature characteristic. However, it is difficult to completely control the eliminated HC, and uncontrolled HC may be somewhat discharged.

Thus, gas containing eliminated HC is circulated again from the downstream side of the HC adsorbing catalyst C through the circulating pipe to the upstream side of the $NO_x$ adsorbing (occluding) catalyst B, controlled in the $NO_x$ adsorbing catalyst, and then discharged from the bypass pipe to the atmosphere.

The technical principle of the present invention has been described. Hereinafter, description is further made with reference to a specific engine control device.

First Embodiment

Figure 7:
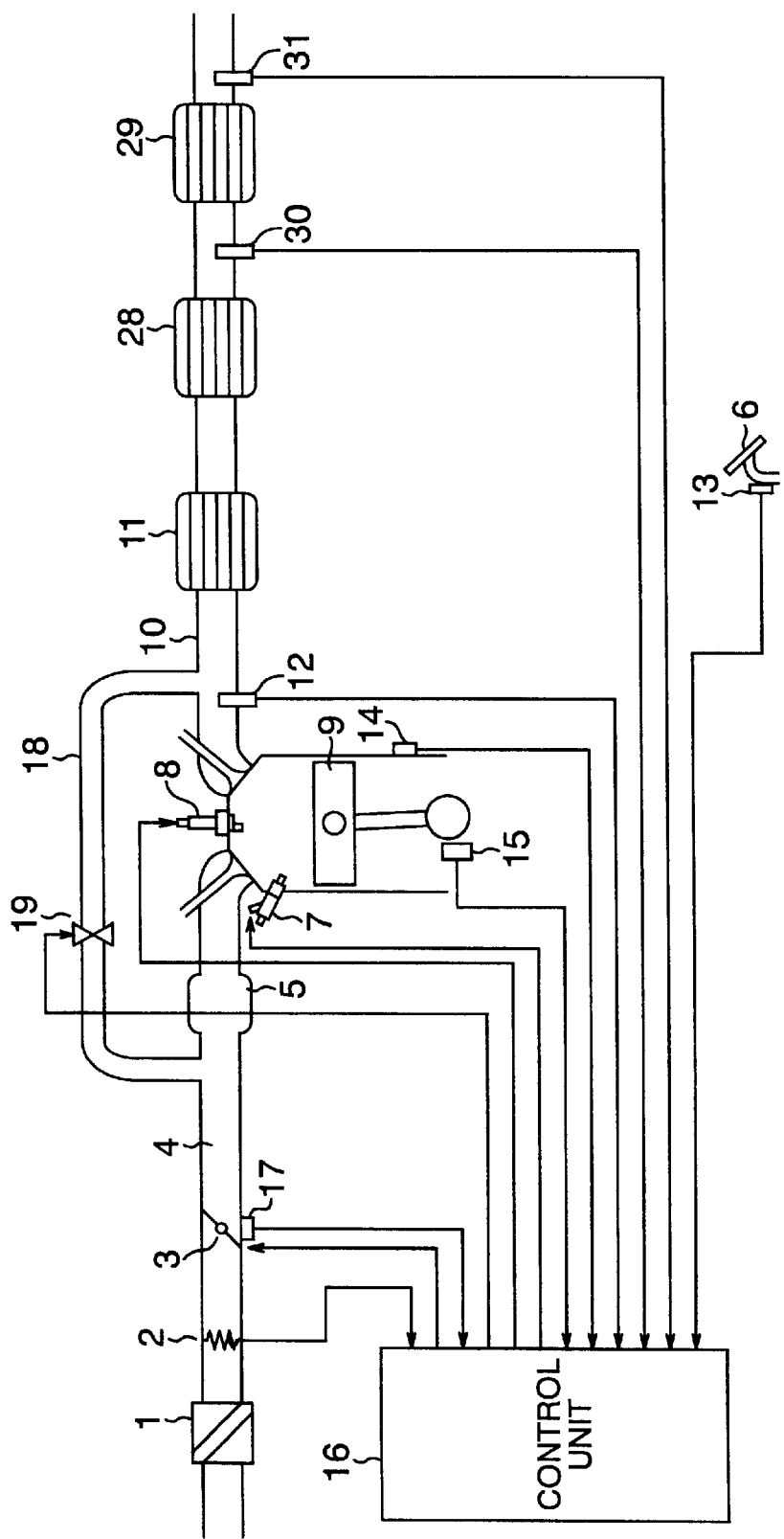
FIG. 7 is a diagram showing an engine control system according to an embodiment of the invention.

FIG. 7 is a system view showing an engine control device.

In a cylinder injection engine 9 composed of a multiple cylinders, external air is passed through an air cleaner 1, and then through an intake pipe 4 and a collector 5 into a cylinder. This intake air flow is adjusted by an electronic throttle 3, and detected by an air flow sensor 2.

A crank angle sensor 15 outputs a signal for each rotational angel of a crankshaft, and a water temperature sensor 14 detects a cooling water temperature of the engine.

An accelerator opening sensor 13 detects a pressing quantity of an accelerator pedal 6, and thereby detects torque requested by a driver.

Signals of an opening sensor 17, the crank angle sensor 15 and the water temperature sensor 14 attached to the accelerator opening sensor 13, the air flow sensor 2 and the electronic throttle 3 are all sent to a control device 16. A driving state of the engine is obtained from these sensor outputs, and main manipulated variables including a quantity of air, a quantity of fuel injection, a ignition timing, and the like, are optimally calculated.

The quantity of fuel injection calculated in the control device 16 is converted into a valve opening pulse signal of a fuel injector, and sent to a fuel injector 7 attached into the cylinder. A signal of the ignition timing calculated by the control device 16 is sent to an ignition plug 8.

The injected fuel is mixed with air from an intake manifold, and then flows into the cylinder of an engine 9 to form a mixture. This mixture is ignited to be burned by sparks generated from the ignition plug 8 at a predetermined ignition timing, and a piston is depressed by its combustion pressure to generate engine power.

Exhaust gas after the burning is sent through an exhaust pipe 10 into a three-way catalyst 11, while a part of the exhaust gas is circulated through an exhaust gas circulating pipe 18 to an intake side. A quantity of this circulation is controlled by a valve 19.

An A/F sensor 12 is attached between the engine 9 and the three-way catalyst 11, and has a linear output characteristic with respect to concentration of oxygen contained in the exhaust gas. Since a relation between the concentration of oxygen contained in the exhaust gas and an air-fuel ratio is substantially linear, an air-fuel ratio can be obtained by the A/F sensor 12 for detecting the concentration of oxygen.

On the downstream side of the three-way catalyst 11, an $NO_x$ adsorbing (occluding) catalyst 28 is provided, and on the further downstream side thereof, an HC adsorbing catalyst 29 is disposed.

As described above, the $NO_x$ adsorbing (occluding) catalyst adsorbs $NO_x$ in a lean state, and emits $NO_x$ in a rich state. The $NO_x$ adsorbing (occluding) catalyst 28 has three-way performance, and a function of circulating $NO_x$ emitted in the lean rich state.

The HC adsorbing catalyst 29 adsorbs HC in a cold state of an engine, eliminates the HC when a specified temperature or higher is reached, and has three-way function and a function of controlling the eliminated HC.

On the upstream side of the HC adsorbing catalyst 29, a temperature sensor 30 is attached to detect an inlet temperature of the HC adsorbing catalyst. In addition, on the downstream side of the HC adsorbing catalyst 29, an $O_2$ sensor 31 is attached.

In the control device 16, an air-fuel ratio on the upstream side of the three-way catalyst 11 is calculated based on a signal from the A/F sensor 12, and F/B (feed-back) control is performed to sequentially control a quantity of fuel injection and a quantity of air such that an air-fuel ratio of the mixture in the engine cylinder can be set equal to a target air-fuel ratio.

Signals of the temperature sensor 30 and the $O_2$ sensor 31 are also sent to the control device 16, and each driving parameter of the engine is controlled in accordance with an inlet temperature of the HC adsorbing catalyst.

Figure 8:
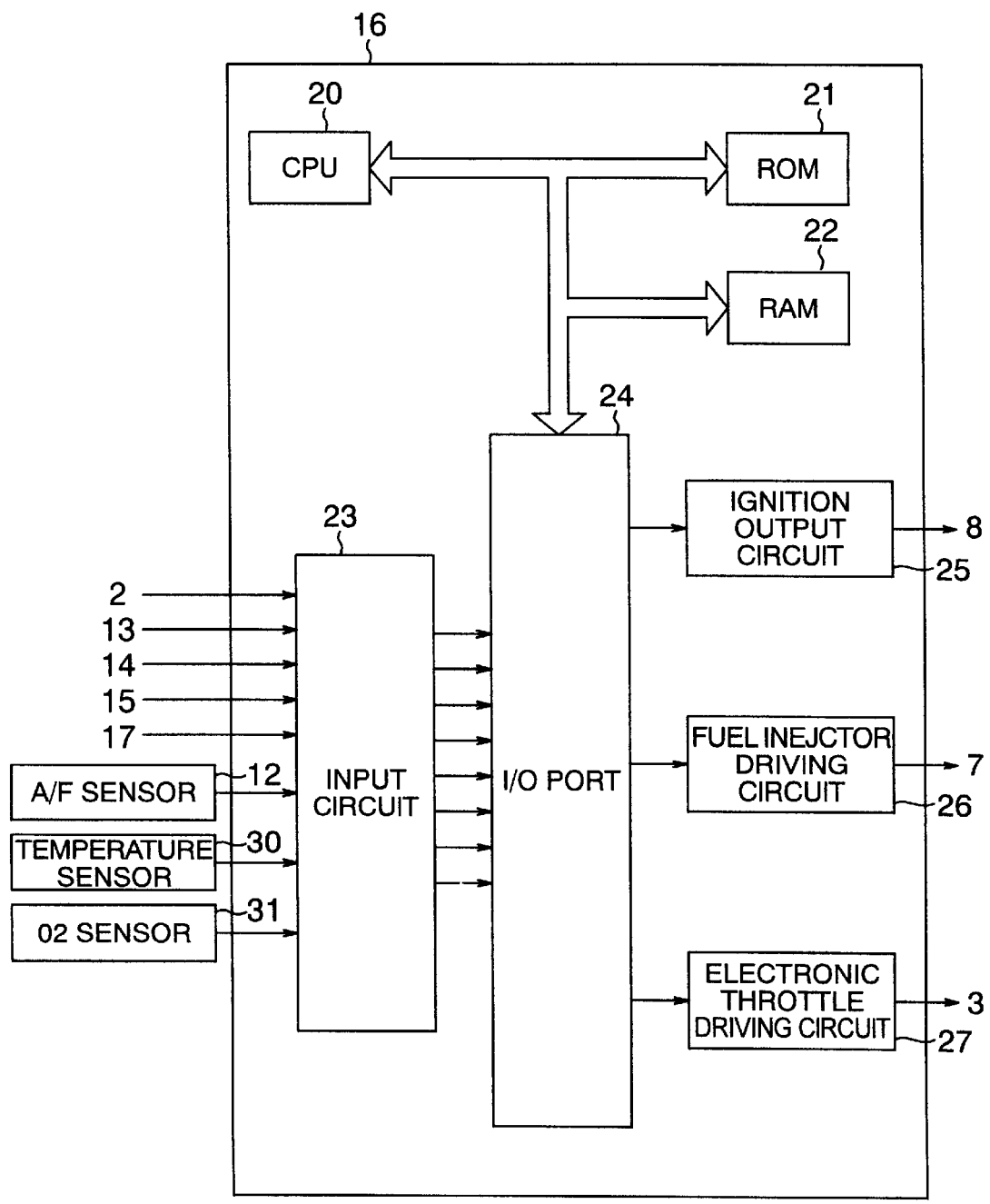
FIG. 8 is a diagram illustrating an inside portion of a control device.

FIG. 8 shows an inside portion of the control device 16. Output values of the A/F sensor, the temperature sensor, the throttle valve opening sensor, the air flow sensor, the engine speed sensor and the water temperature sensor are entered to the control device 16. These output values are subjected to signal processing such as noise removal at an input circuit 23, and then sent to an I/O port 24. The values at the input port are stored in a RAM 22, and subjected to arithmetic processing in a CPU 20.

A control program describing a content of the arithmetic processing is written beforehand in a ROM 21. A value representing an operation variable of each actuator calculated in accordance with the control program is stored in the RAM 22, and then sent to an output port 24.

For an operation signal of the ignition plug used for mixture ignition, an ON/OFF signal turned ON in a conductive state of a primary side coil in an ignition output circuit, and OFF in a non-conductive state is set.

An ignition timing is when a change is made from ON to OFF, and a signal for the ignition plug set in the output port is amplified to be sufficient energy necessary for burning at an ignition output circuit 25, and supplied to the ignition plug.

For a driving signal of a fuel injector, an ON/OFF signal turned ON in an open state of the injector, and OFF in an closed state thereof is set. This signal is amplified to be energy enough for opening the fuel injector at a fuel injector driving circuit 26, and then sent to the fuel injector 7.

A driving signal for achieving a target opening of the electronic throttle 3 is sent through an electronic throttle driving circuit 28 to the electronic throttle 3.

Figure 9:
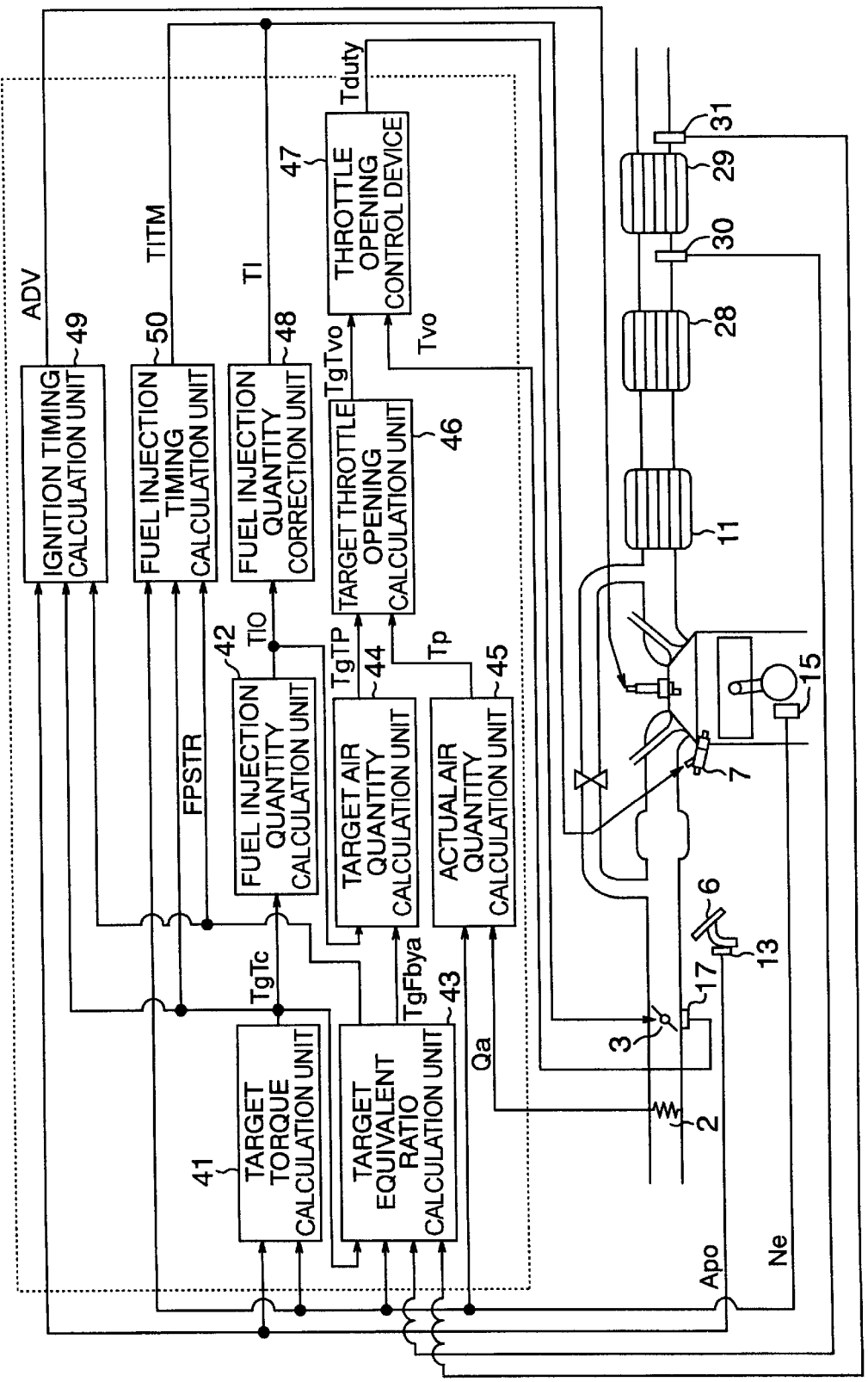
FIG. 9 is a control block diagram of the embodiment shown in FIG. 7.

Next, description is made in outline of engine control by referring to FIG. 9, which is a block diagram showing overall control, specifically a main portion of fuel leading type torque demand control.

This control system includes a target torque calculation unit 41, a fuel injection quantity calculation unit 42, a target equivalent ratio calculation unit 43, a target air quantity calculation unit 44, an actual air quantity calculation unit 45, a target throttle opening calculation unit 46, and a throttle opening control device 47.

First, at the target torque calculation unit 41, target torque TgTc is calculated from an accelerator opening Apo and an engine speed Ne and, then, at the fuel injection quantity calculation unit 42, a fuel injection quantity TI0 for achieving the target torque is calculated. At the fuel injection quantity correction unit 48, phase correction is carried out to match the fuel injection quantity TI0 with a movement phase of air in the cylinder, and a fuel injection quantity after the correction is set as TI.

At the target equivalent ratio calculation unit 43, a target equivalent ratio TgFbya is calculated from the target torque TgTC and the engine speed Ne. A ratio of fuel and air is processed based on such an equivalent ratio only for convenience of calculation, and it can be processed based on an air-fuel ratio.

At the target equivalent ratio calculation unit 43, which of homogenous charge combustion or stratified charge combustion should be performed is decided, and a stratified charge permission flag FPSTR, described later, is used.

Here, the homogenous charge combustion means that a mixture is burned in a substantially homogeneous state of its concentration in the system. The stratified charge combustion means that a mixture is burned in a state where are relatively rich mixture is generated around the ignition plug and concentration of the mixture becomes leaner away from the ignition plug. Especially, in the case of the stratified charge combustion, at considerably lean concentration of a mixture as a whole, for example an air-fuel ratio of about 40, the engine can be driven.

At the target air quantity calculation unit 44, a target air quantity TgTp is calculated from the air fuel injection quantity TI0 and the target equivalent ratio TgFbya. As described later, the target air quantity TgTp is set to a value standardized to an air quantity flowing into one cylinder per cycle for convenience.

At the actual air quantity calculation unit 45, Qa as a mass flow rate of air detected by the air flow sensor is converted into an actual air quantity Tp flowing into one cylinder per cycle at the same dimension as that of TgTp, and outputted.

At the target throttle opening calculation unit 46, a target throttle opening TgTvo is calculated based on the target air quantity Tp and the actual air quantity Tp.

At the throttle opening calculation unit 47, a throttle operation variable Tduty is calculated based on the target throttle opening TgTvo and the actual opening Tvo. This operation variable Tduty represents a duty ratio of a PWM signal entered to a driving circuit for controlling a throttle motor driving current.

At the ignition timing calculation unit 49, an optimal ignition timing is calculated in accordance with each driving condition. At the fuel injection time calculation unit 50, an optimal injection time is calculated in accordance with each driving condition.

Now, detailed description is made of specific control blocks of the control system.

Figure 10:
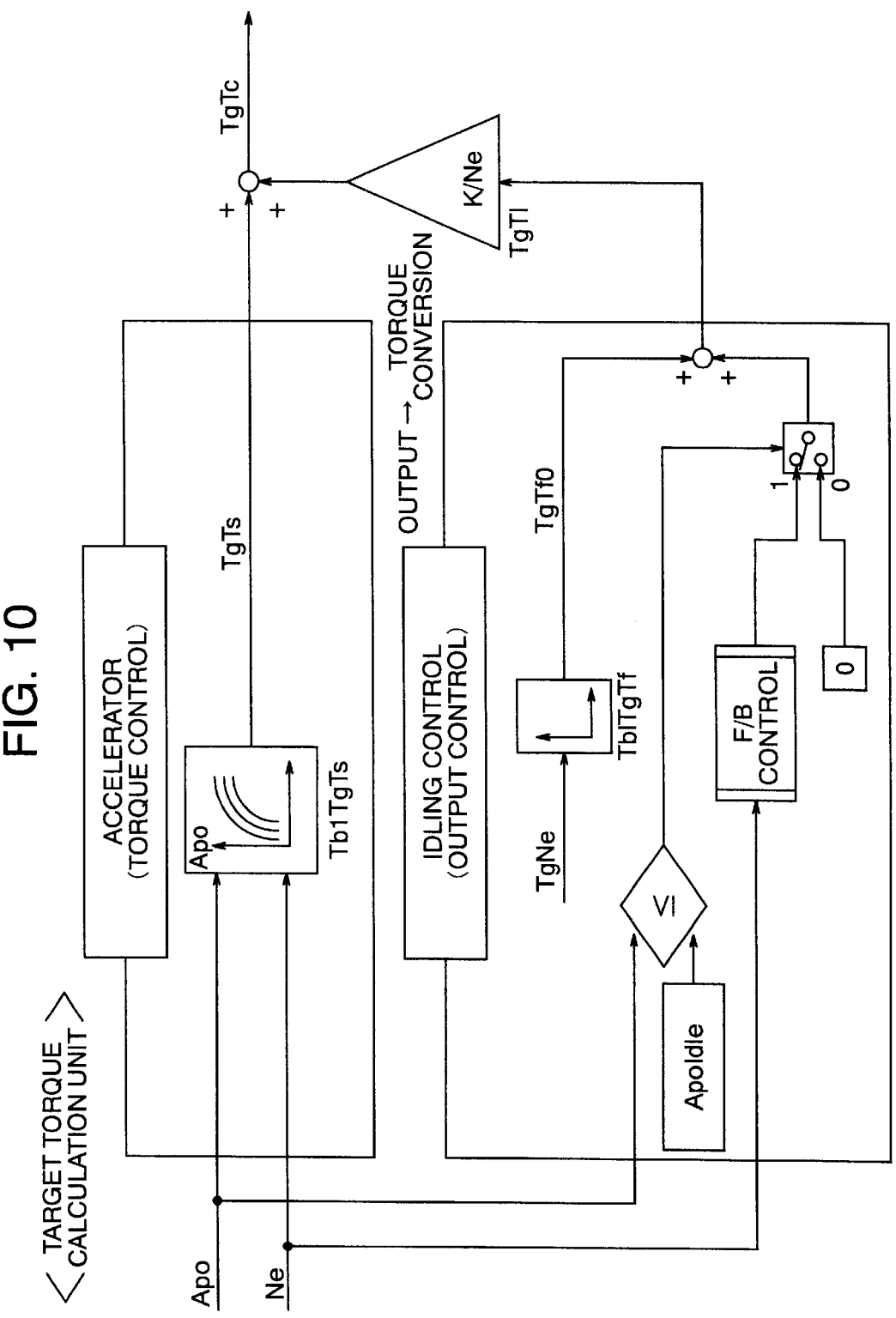
FIG. 10 is a diagram illustrating a target torque calculation unit.

(1) Target Torque Calculation Unit (FIG. 10)

The target torque calculation unit 41 is one shown in FIG. 10, where a reference code TgTc represents target fuel pressure equivalent torque.

A reference code TgTc represents accelerator request torque; and TgTl an air flow rate equivalent to idling speed maintenance, having a proportional relation to an output.

Here, the accelerator request is for torque control, and idling control is output control. An operation variable TgTl of the idling control is set as an air flow rate in a stoichiometry state having a proportional relation to an output. A gain K/Ne is provided to make dimensional conversion of an output into torque, and K is decided by a flow rate characteristic of the injector.

Idling F/B control TgTf0 is decided based on the target speed TgNe by referring to a table TblTgTf, and idling F/F purifying functions to correct an error of the F/F control only during idling.

Idling time is determined when an accelerator opening Apo is smaller than a predetermined value Aplldle. For an F/B control algorithm, not shown here, for example PID control may be performed. A set value of TblTgTgf should preferably be set from experiment data by a real machine.

Figure 11:
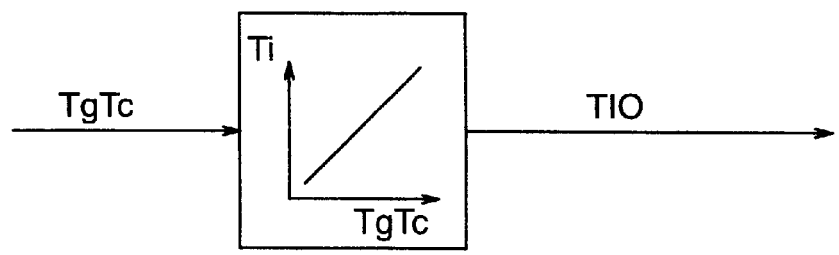
FIG. 11 is a diagram illustrating a fuel injection quantity calculation unit.

(2) Fuel Injection Quantity Calculation Unit (FIG. 11)

The fuel injection quantity calculation unit 42 is shown in FIG. 11, where target combustion pressure torque TgTc is uniquely converted into a fuel injection quantity. Here, TI0 represents a fuel injection quantity per one cylinder and one cycle, and thus it is proportional to torque. The target combustion torque TgTc is converted to TI0 by using this proportional relation.

In this case, the conversion may be made based on a gain. However, conversion may be made by referring to the table by considering a slight error, and a set value should preferably be decided from experiment data by the real machine.

Figure 12:
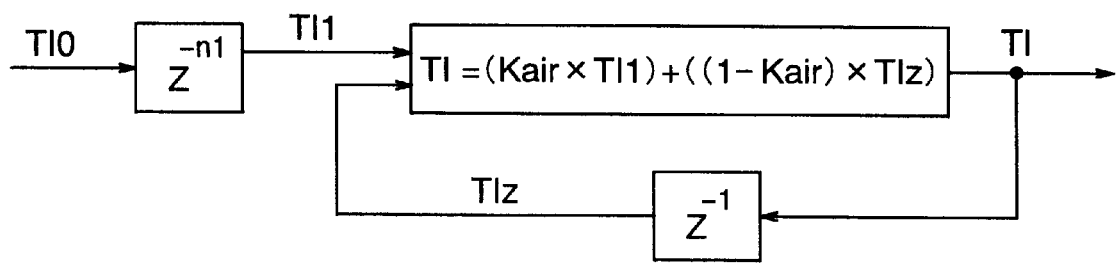
FIG. 12 is a diagram illustrating a fuel injection quantity correction unit.

(3) Fuel Injection Quantity Correction Unit (FIG. 12)

The fuel injection quantity correction unit 48 is shown in FIG. 12, where correction is made to match a fuel injection quantity TI0 with a phase of air in the cylinder. For example, an air transmission characteristic from the throttle to the cylinder is approximated by Dead Time+First-order Lag System, and set values of a parameter n1 representing the idling time and a time constant equivalent parameter Kair of a first-order lag system should preferably be set from experiment data by the real machine. In addition, the parameters n1 and Kair may be changed in accordance with various driving conditions.

Figure 13:
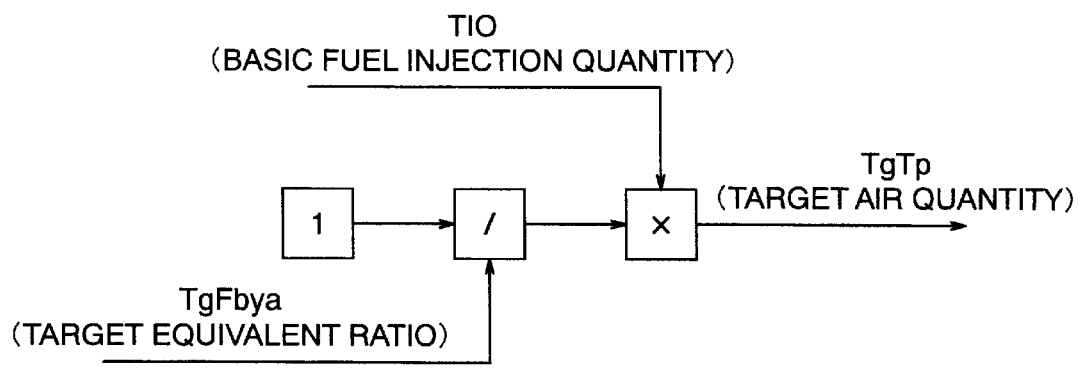
FIG. 13 is a diagram illustrating a target air quantity calculation unit.

(4) Target Air Quantity Calculation Unit (FIG. 13)

The target air quantity calculation unit 44 is shown in FIG. 13, where a function is provided to calculate a target air quantity and, for convenience, a target air quantity is calculated as a value standardized to an air quantity flowing into one cylinder per cycle.

As shown in FIG. 13, a target air quantity TgTp is calculated as follows:

$$TgTp=TI0\times(1/TgFbya)$$

Figure 14:
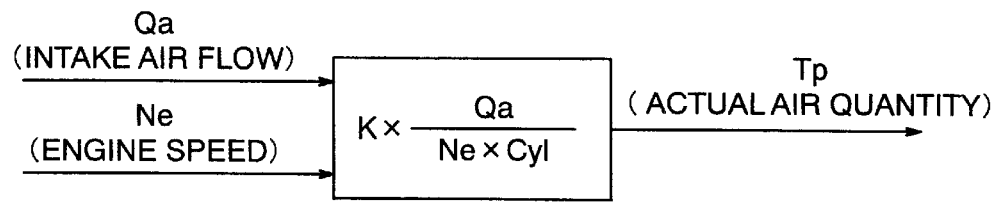
FIG. 14 is a diagram illustrating a real air quantity calculation unit.

(5) Air Quantity Calculation Unit (FIG. 14)

The actual quantity calculation unit 45 is shown in FIG. 14, where a function is provided to calculate an actual air quantity. For convenience, as shown in FIG. 14, an actual air quantity is calculated as a value standardized to an air quantity flowing into one cylinder per cycle.

Here, Qa represents an air flow rate detected by the air flow sensor 2, K is decided in such a way as to set Tp to a fuel injection quantity at a stoichiometric air-fuel ratio, and Cyl represents the number of engine cylinders.

Figure 15:
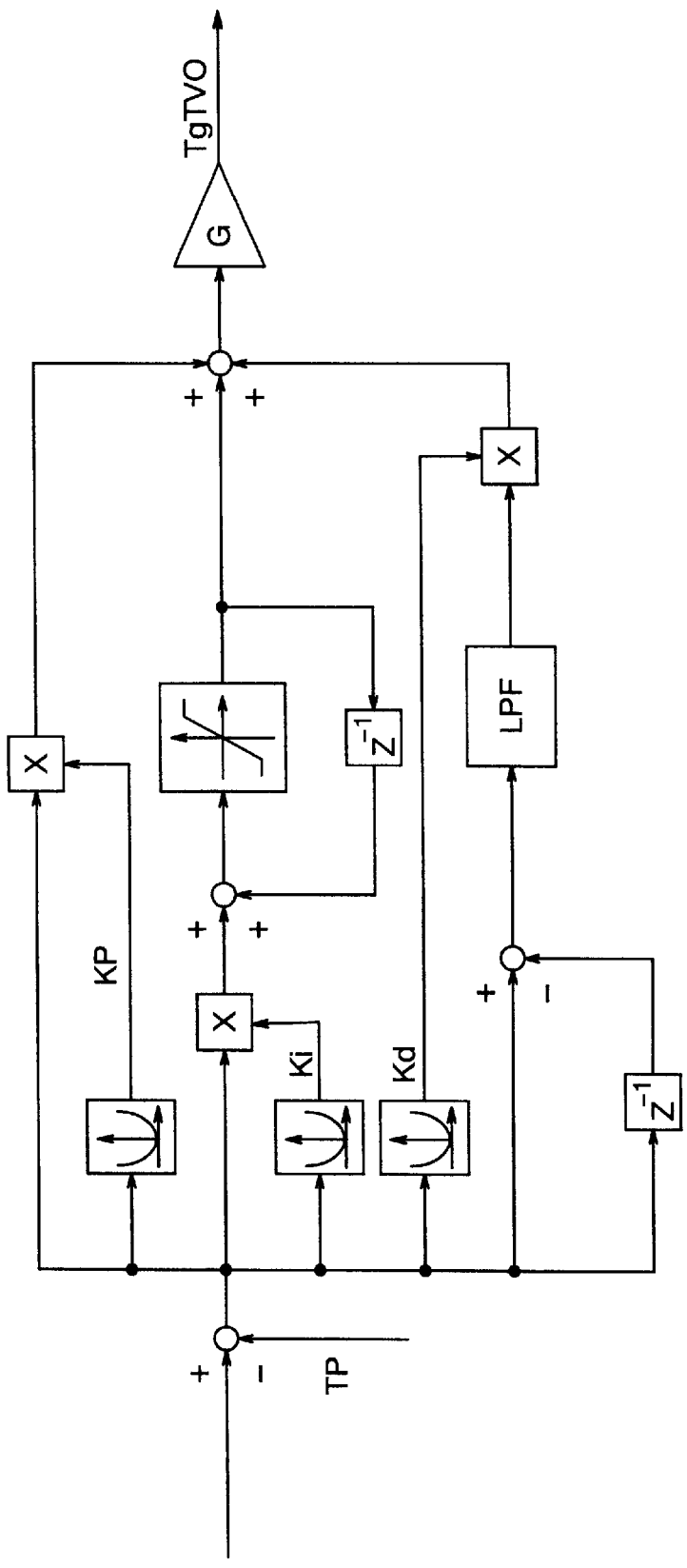
FIG. 15 is a diagram illustrating a target throttle opening calculation unit.

(6) Target Throttle Opening Calculation Unit (FIG. 15)

The target throttle opening calculation unit 46 is shown in FIG. 15, where a target throttle opening TgTVO is obtained from the target air quantity TgTp and the real air quantity Tp. In this control block, a target throttle opening TgTVO is obtained from the target air quantity TgTP and the real air quantity Tp.

F/B control is set as PID control, and each gain is given by a size of deviation between TgTp and Tp. However, a specific value should preferably be obtained from experiment data by the real machine. For D, a low pass filter (LPF) is provided to remove high-frequency noises.

Figure 16:
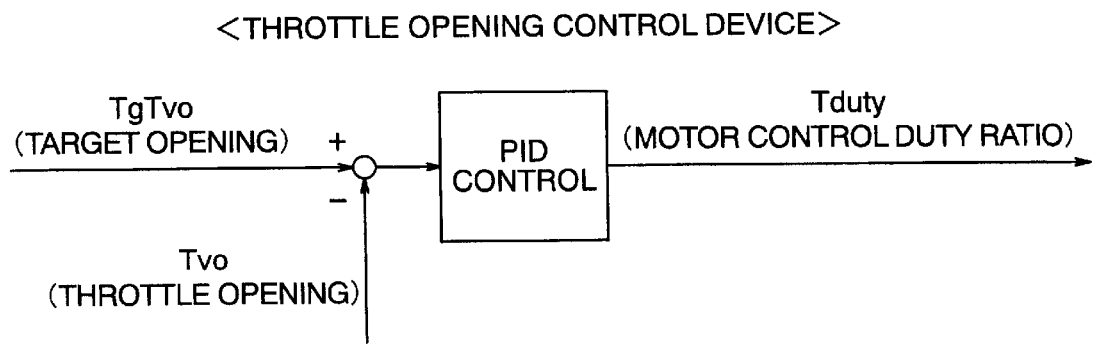
FIG. 16 is a diagram illustrating a throttle opening control device.

(7) Throttle Opening Control Device (FIG. 16)

The throttle opening control device 47 is shown in FIG. 16, where a throttle driving operation variable Tduty is calculated based on the target throttle opening TgTVO and an actual throttle opening Tvo.

As described above, a value Tduty represents a duty ratio of a PWM signal entered to the driving circuit for controlling a throttle motor driving current, and here Tduty is obtained from PID control. Though not described in detail, each gain of the PID control should preferably be tuned to be optimal by using the real machine.

Figure 17:
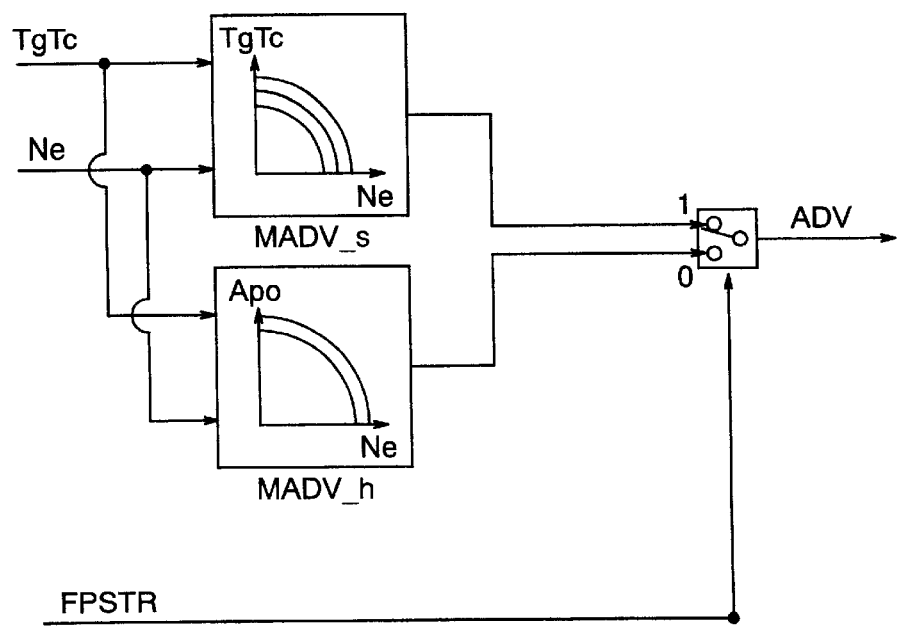
FIG. 17 is a diagram illustrating an ignition timing calculation unit.

(8) Ignition Timing Calculation Unit (FIG. 17)

Figure 18:
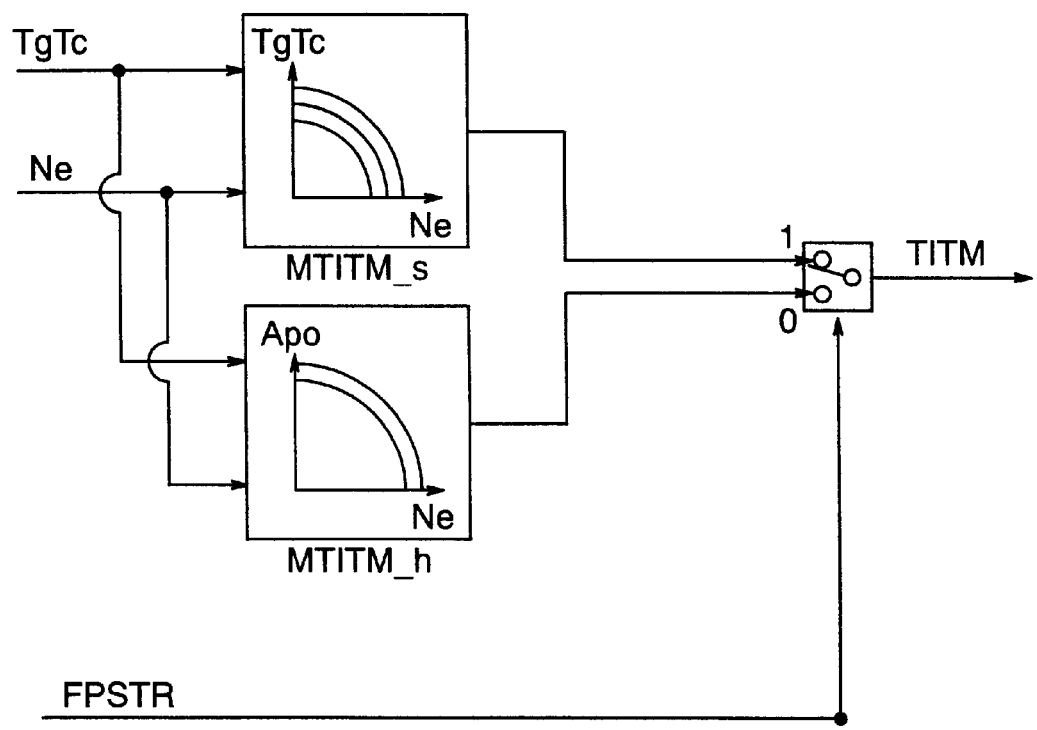
FIG. 18 is a diagram illustrating an injection timing calculation unit.

The ignition timing calculation unit 49 is shown in FIG. 18, where an ignition timing ADV is obtained when the above-described stratified charge permission flag FPSTR=1 is established, i.e., at stratified charge permission time, by using TgTc and Ne and referring to an ignition timing MADV_s.

On the other hand, when the stratified charge permission flag FPSTR=0 is established, i.e., at stratified charge inhibition time, an ignition timing is obtained by using TgTc and Ne, and referring to an ignition timing MADV_h.

Preferably, a value of MADV_h should be decided to be MBT according to engine performance, and a value of MAD_s should be decided to be optimal by considering combustion stability in matching with a later-described injection time.

(9) Fuel Injection Timing Calculation Unit (FIG. 18)

The fuel injection timing calculation unit 50 is shown in FIG. 18, where an injection timing TITM is obtained when the stratified charge permission flag FPSTR=1 is established, i.e., at stratified charge permission time, by using TgTc and Ne, and referring to an ignition timing MTITM_s.

On the other hand, when the stratified charge permission flag FPSTR=0 is established, i.e., at stratified charge inhibition time, an ignition timing is obtained by using TgTc and Ne, and referring to an ignition timing MTITM_h. Preferably, values of the MTITM_h and the MADV_S should be decided to be optimal by considering combustion stability in matching with the above-described ignition timing.

(10) Target Equivalent Ratio Calculation Unit (FIG. 19)

The target equivalent ratio calculation unit 43 is shown in FIG. 19, where a state of combustion and a target equivalent ratio are calculated. To perform stratified charge combustion when the stratified charge permission flag FPSTR=1 is established, an injection time, an ignition timing, an injection quantity and an air quantity are controlled. Specifically, for the FPSTR, the stratified charge permission flag FPSTR=1 is set with Tcn≧TcnL and Tcn≦TcnH. Other than this, FPSTR=0 is set.

Here, a code Tcn represents an upstream temperature of the HC adsorbing catalyst. TcnL should preferably be set to a temperature, at which elimination of adsorbed HC in the HC adsorbing catalyst is started, generally in a range of 100° C. to 200° C. depending on a position of the sensor.

TcnH should preferably be set to an activation temperature of a three-way catalyst in the HC adsorbing catalyst, in a range of 250° C. to 400° C. depending on catalyst performance.

At stratified charge combustion permission time, for a target equivalent ratio map Mtgfba_s for stratified charge combustion, a value referenced from target combustion pressure torque TgTc and a speed Ne is set as a target equivalent ratio TgFbya.

With TgFbya=0, homogenous charge combustion is performed and, for a target equivalent ratio map Mtgfba for a homogenous charge combustion, a value referenced from the target combustion pressure torque TgTc and the speed Ne is set as a target equivalent ratio TgFbya.

Preferably, set values of a target equivalent ratio map Mtgfba_s for stratified charge combustion, and a target equivalent ratio map Mtgfba for homogenous combustion should be decided based on experiment data by the real machine.

In the embodiment, the stratified charge permission depends only on the temperature of the HC adsorbing catalyst temperature. For the purpose of improving fuel economy, however, stratified charge permission may be set by separately determining a driving area to be charged in a stratified manner.

For example, for the FPSTR, if values of a water temperature Twn, an accelerator opening Apo, and an engine speed Ne satisfy given conditions, FPSTR=1 is set to permit stratified charge combustion.

Thus, the target equivalent ratio calculation unit 43 decides a state of combustion, and calculates a target equivalent ratio. In the case of the invention, when a signal is received from the temperature sensor 30 provided on the upstream side of the HC adsorbing catalyst, stratified charge permission flag=1 is set by estimating the starting of elimination of HC from the HC adsorbing catalyst with Tcn≧TcnL and Tcn≦TcnH. Then, a fuel injection time, an ignition timing, an injection quantity and an air quantity are controlled to perform stratified charge combustion, i.e., combustion in a lean state, with the stratified charge permission flag FPSTR=1.

Second Embodiment

Figure 20:
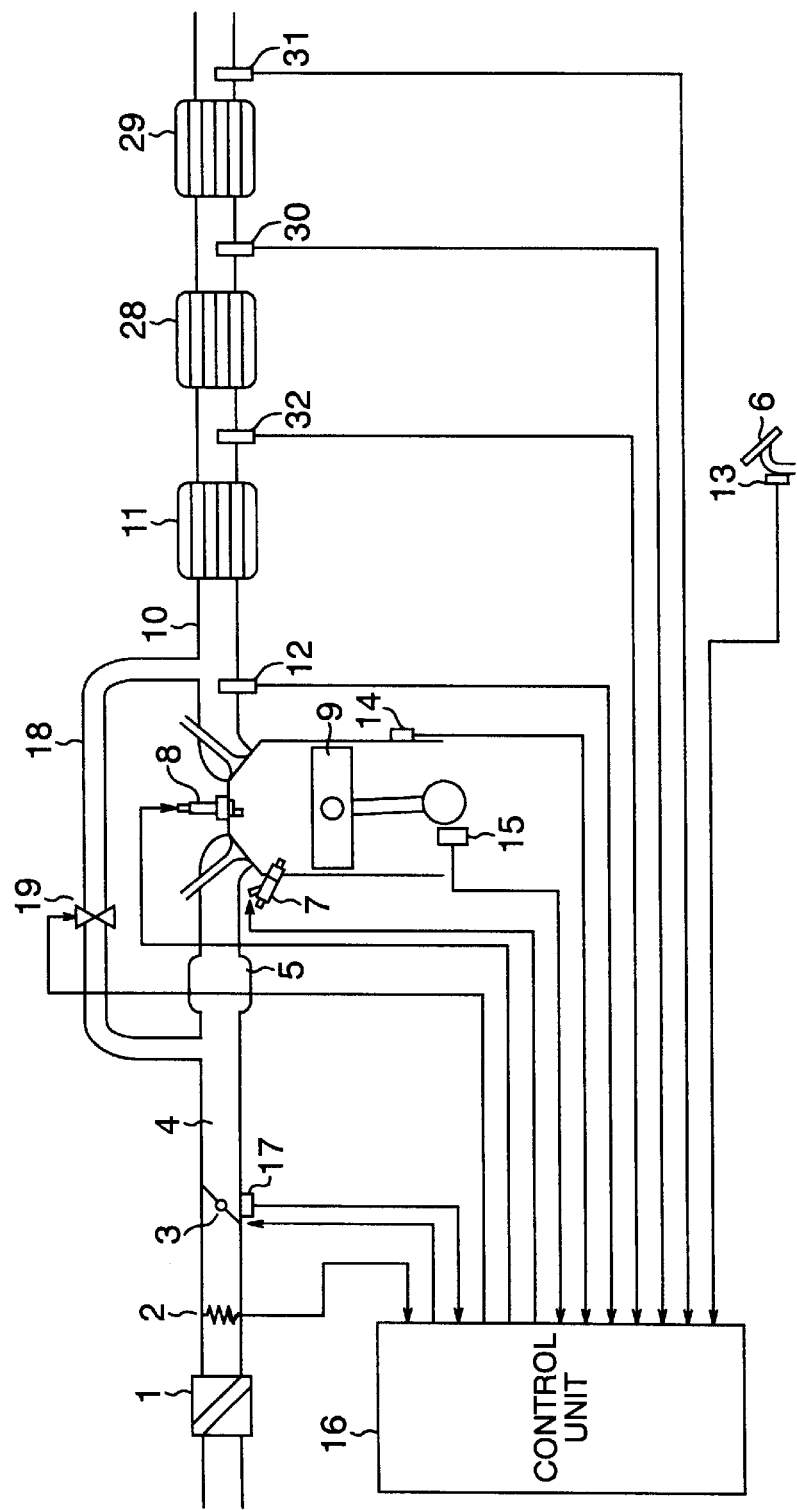
FIG. 20 is a diagram showing an engine control system according to another embodiment of the invention.

An embodiment shown in FIG. 20 is an example, where a temperature sensor 32 is additionally provided on the upstream side of the $NO_x$ adsorbing (occluding) catalyst 28 in the system of the foregoing first embodiment (FIG. 7). Thus, explanation overlapped with the first embodiment will be omitted.

Figure 21:
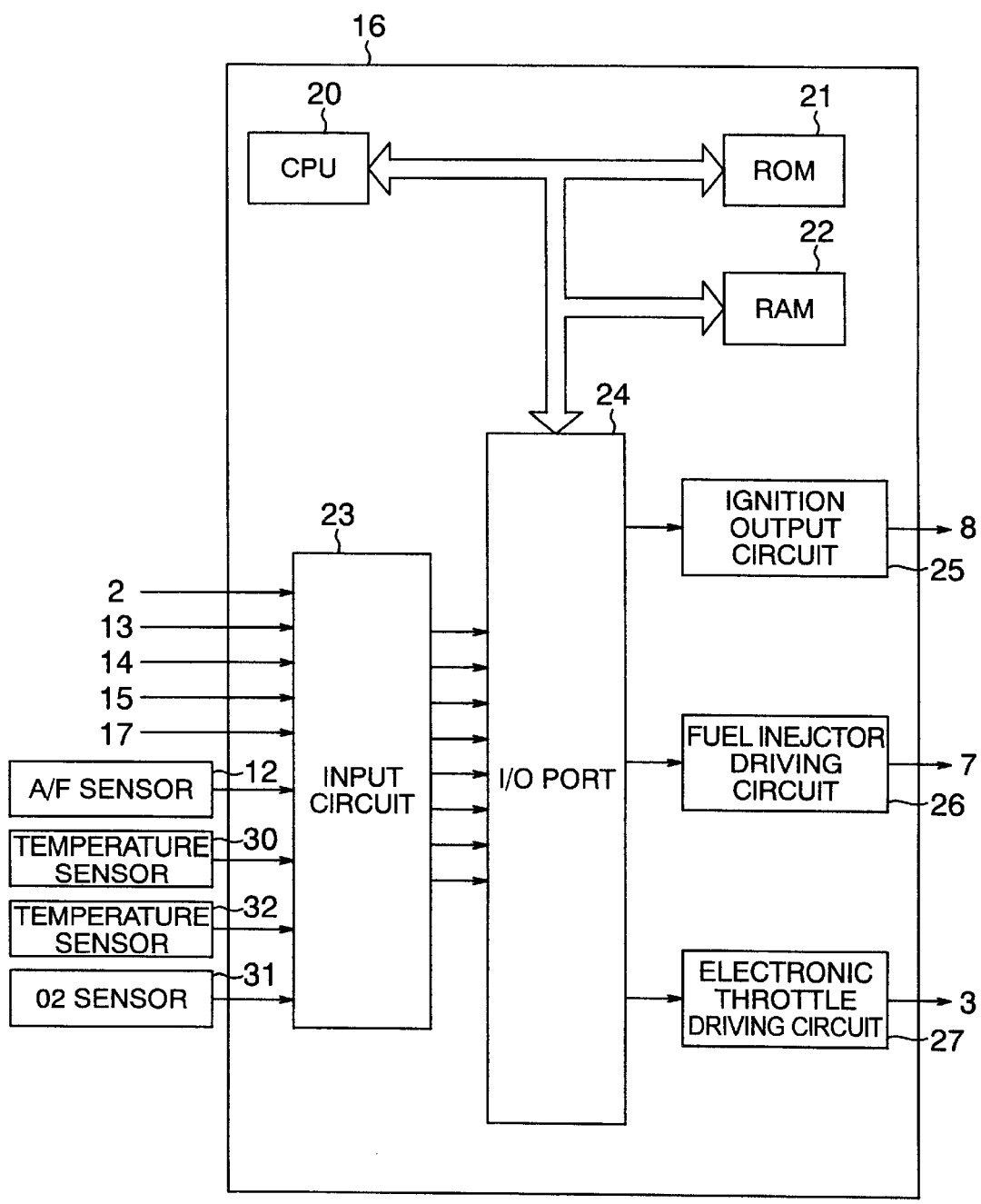
FIG. 21 is a diagram illustrating an inside portion of a control device.

FIG. 21 shows an inside portion of a control device 16. An input terminal of a temperature sensor 32 is added, and other portions are similar to those of the first embodiment. Thus, explanation overlapped with the first embodiment will also be omitted.

Figure 22:
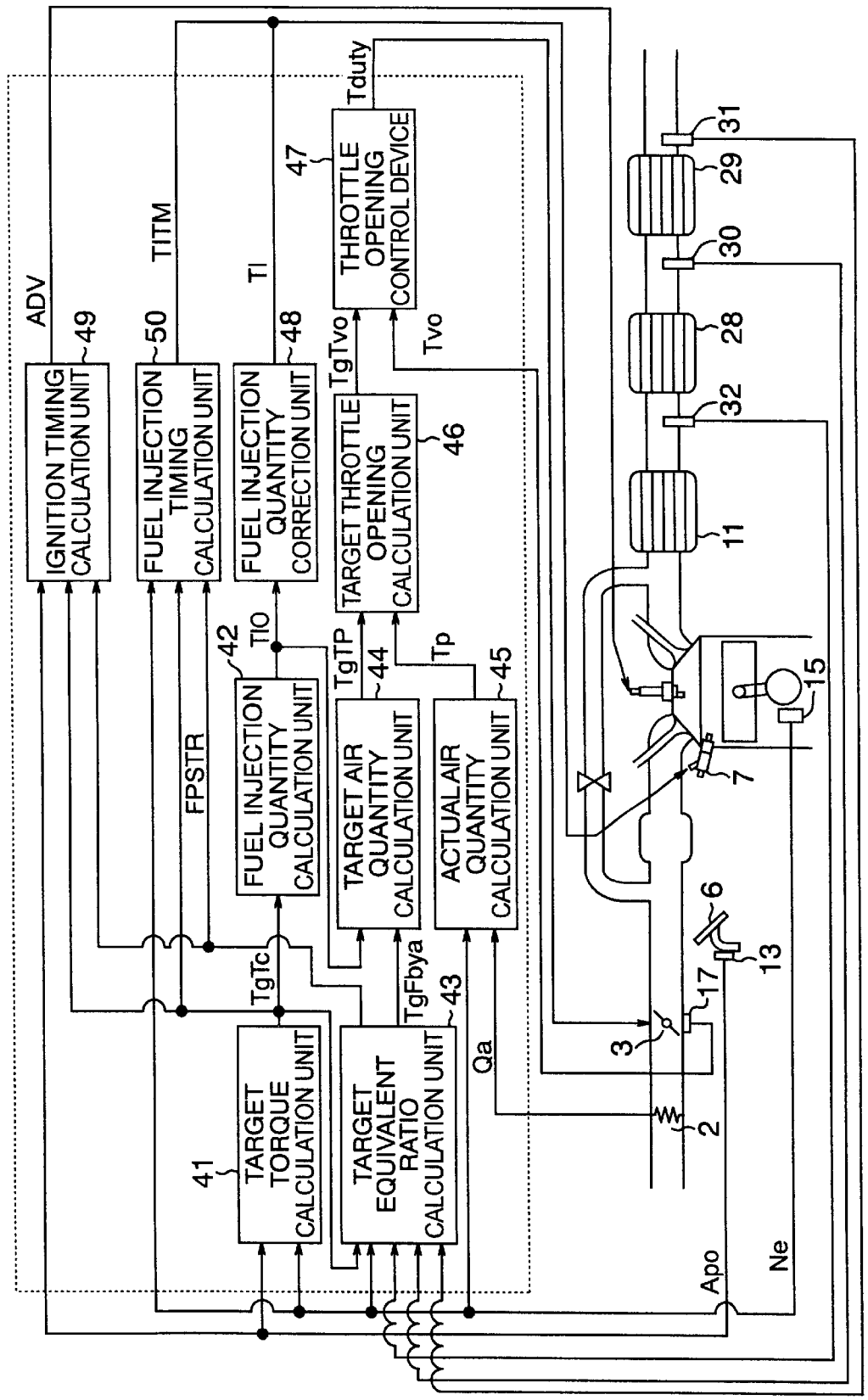
FIG. 22 is a control block diagram of the embodiment shown in FIG. 24.

FIG. 22 is a block diagram of overall control. A temperature sensor 32 is additionally provided on the upstream side of an $NO_x$ adsorbing (occluding) catalyst 28, and its signal is used as an input signal of a target equivalent ratio calculation unit in the block diagram of the first embodiment. Other portions are similar, and thus description thereof will be omitted. Hereinafter, detailed description is made of specific control blocks. In this case, the control system also includes a target torque calculation unit 41, a fuel injection quantity calculation unit 42, a fuel injection quantity correction unit 48, a target air quantity calculation unit 44, an actual air quantity calculation unit 45, a target throttle opening calculation unit 46, a throttle opening control device 47, an ignition timing calculation unit 49, and a fuel injection time calculation unit 50. These units are all similar to those of the first embodiment, and thus description thereof will be omitted.

Figure 23:
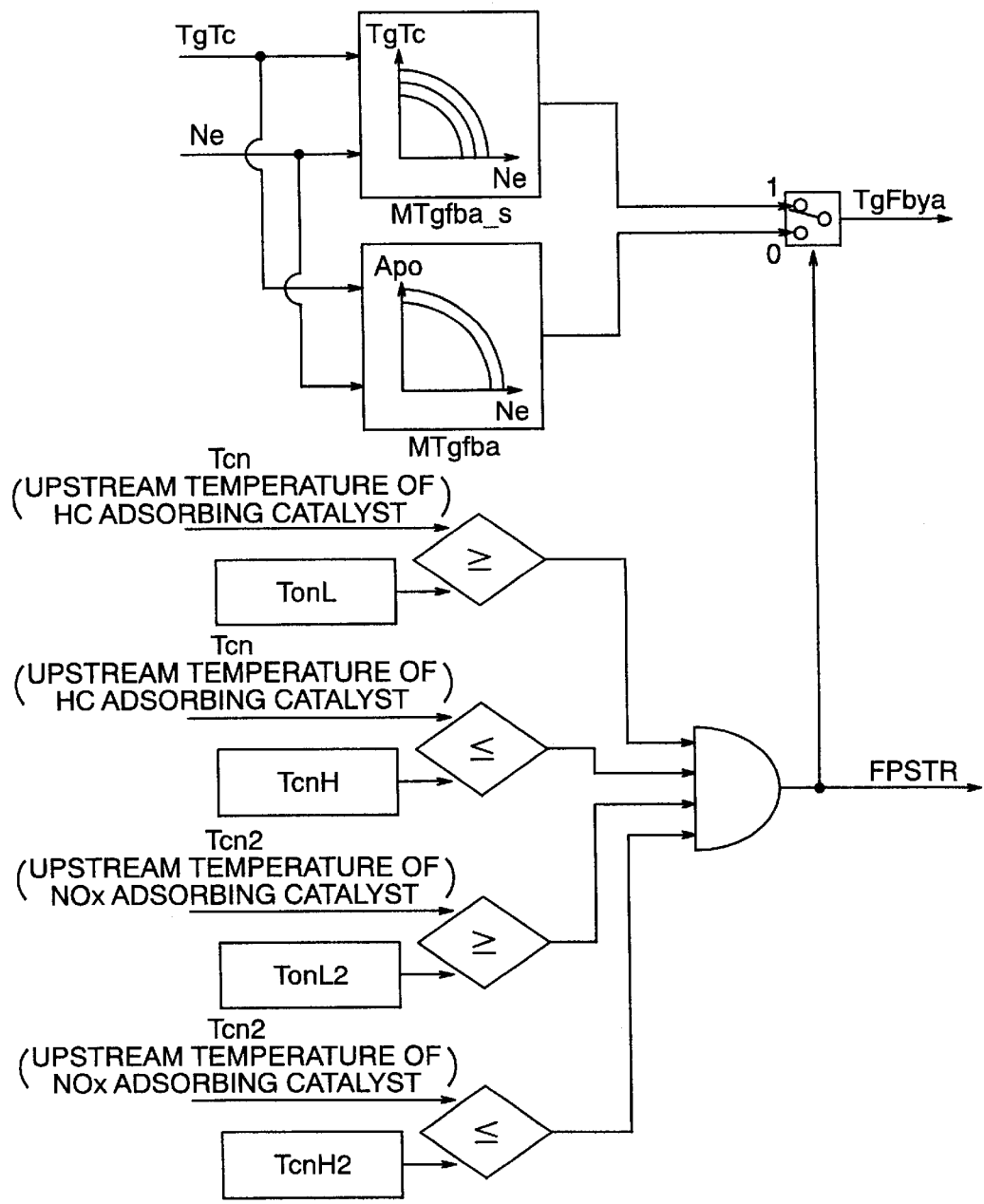
FIG. 23 is a diagram illustrating a target equivalent ratio calculation unit.

A target equivalent ratio calculation unit 43 is shown in FIG. 23, which is designed to decide a state of combustion, and calculate a target equivalent ratio. A code FPSTR represents a stratified charge permission flag, and an injection timing, an ignition timing, an injection quantity, and an air quantity are controlled in such a way as to perform stratified charge combustion with FPSRT=1.

For the FPSTR, a stratified charge permission flag FPSTR=1 is set with Tcn≧TcnL, Tcn≦TcnH, Tcn2≧TcnL2, and Tcn2≦TcnH2. A code Tcn represents an upstream temperature of an HC adsorbing catalyst; and Tcn2 an upstream temperature of an $NO_x$ adsorbing (occluding) catalyst.

Here, preferably, TcnL should be set to a temperature for starting elimination of adsorbed HC in the HC adsorbing catalyst, generally in a range of 100° C. to 200° C. depending on a position of the sensor. TcnH should preferably be set to an activation temperature of a three-way catalyst in the HC adsorbing catalyst, in a range of 250° C. to 400° C. depending on catalyst performance.

Preferably, TcnL2 and TcnH2 should be set in a temperature zone for causing the $NO_x$ catalyst to exhibit adsorption (occlusion) performance. Depending on catalyst performance, TcnL2 is set around 300° C.; and TcnH2 around 400° C.

At stratified charge combustion permission time, for a target equivalent ratio map Mtgfba_s for stratified charge combustion, a value referenced from target combustion pressure torque TgTc and an engine speed Ne is set as a target equivalent ratio TgFbya.

With TgFbya=0, homogenous charge combustion is performed and, for a target equivalent ratio map Mtgfba for a homogenous charge combustion, a value referenced from the target combustion pressure torque TgTc and the engine speed Ne is set as a target equivalent ratio TgFbya. Preferably, set values of a target equivalent ratio map Mtgfba_s for stratified charge combustion, and a target equivalent ratio map Mtgfba for homogenous combustion should be decided based on experiment data by the real machine.

In the embodiment, the stratified charge permission depends only on the temperature of the HC adsorbing catalyst temperature. For the purpose of improving fuel economy, however, stratified charge permission may be set by separately determining a driving area to be charged in a stratified manner. For example, specifications may be added where for the FPSTR, if values of a water temperature Twn, an accelerator opening Apo, and an engine speed Ne satisfy given conditions, FPSTR=1 is set to permit stratified charge combustion.

Thus, according to the embodiment, when the HC adsorbing catalyst is activated to change to lean combustion, a quantity of lean shifting can be controlled in accordance with the temperature of the $NO_x$ adsorbing (occluding) catalyst. As a result, it is possible to efficiently control $NO_x$.

Third Embodiment

Figure 24:
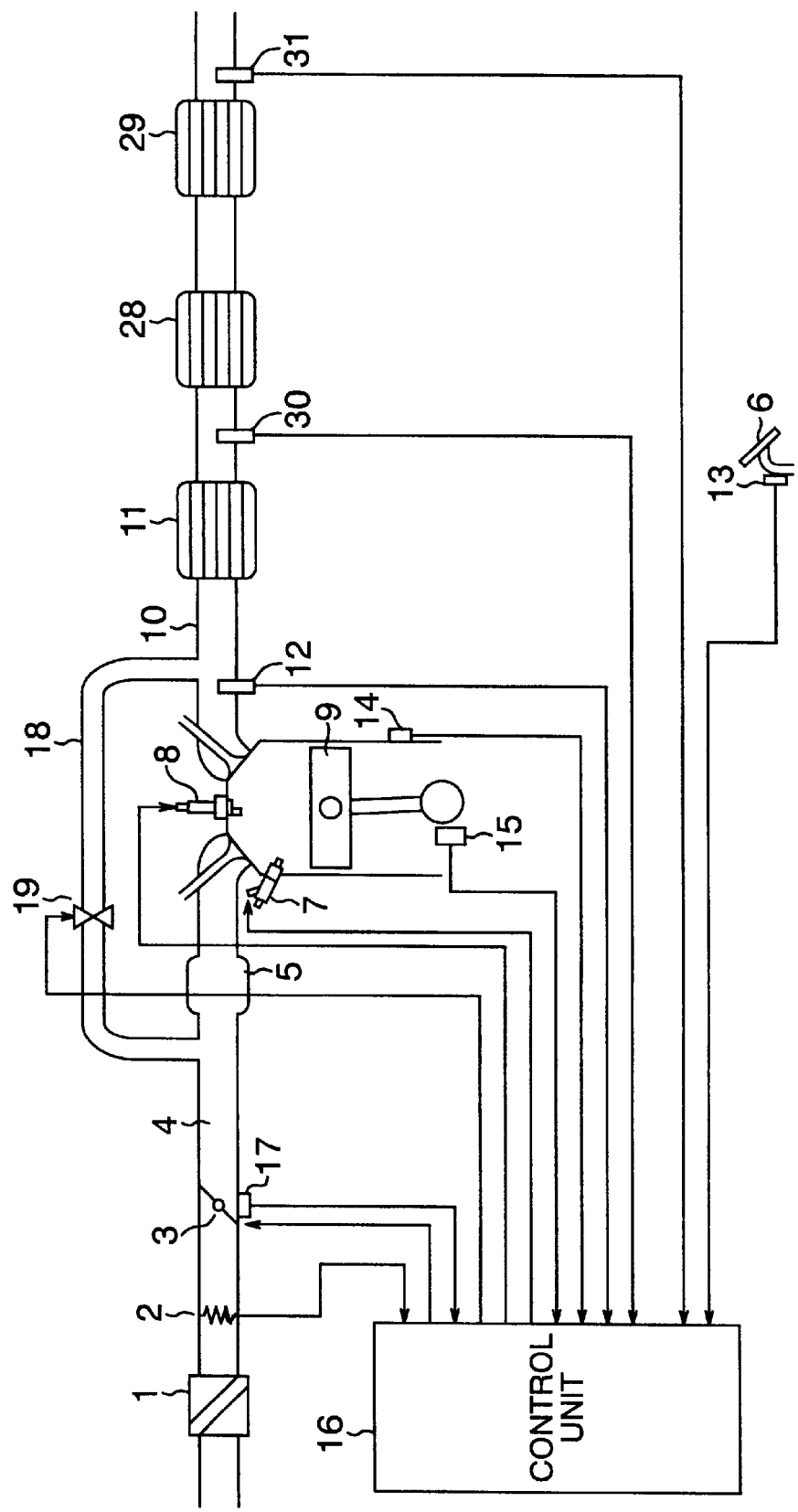
FIG. 24 is a diagram showing an engine control system according to yet another embodiment of the invention.

An embodiment shown in FIG. 24 is different from the second embodiment in that the temperature sensor located on the upstream side of the HC adsorbing catalyst is abolished, and one temperature sensor is provided on the upstream side of the $NO_x$ adsorbing (occluding) catalyst, and a temperature of the HC adsorbing catalyst is estimated by the temperature sensor located on the upstream side of the $NO_x$ adsorbing (occluding) catalyst. Thus, detailed description of FIG. 24 will be omitted.

Figure 25:
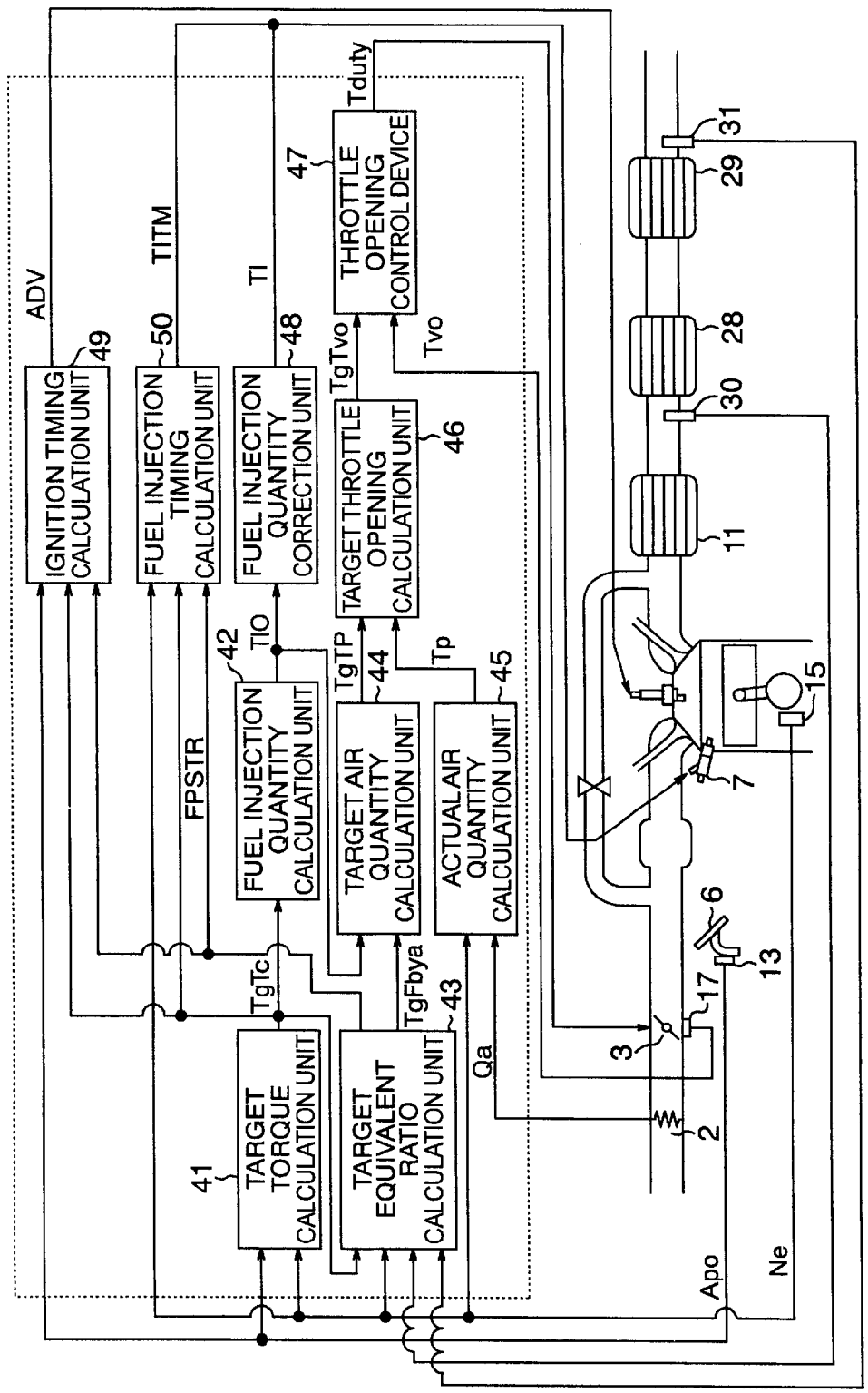
FIG. 25 is a control block diagram of the embodiment shown in FIG. 24.

FIG. 25 is a block diagram showing overall control. The temperature sensor 32 located on the upstream side of the HC adsorbing catalyst in the block diagram of the second embodiment is abolished. Thus, detailed description will be omitted.

Hereinafter, detailed description is made of specific control blocks. In this case, the control system also includes a target torque calculation unit 41, a fuel injection quantity calculation unit 42, a fuel injection quantity correction unit 48, a target air quantity calculation unit 44, an actual air quantity calculation unit 45, a target throttle opening calculation unit 46, a throttle opening control device 47, an ignition timing calculation unit 49, and a fuel injection timing calculation unit 50. These units are all similar to those of the first embodiment, and thus description thereof will be omitted.

Figure 26:
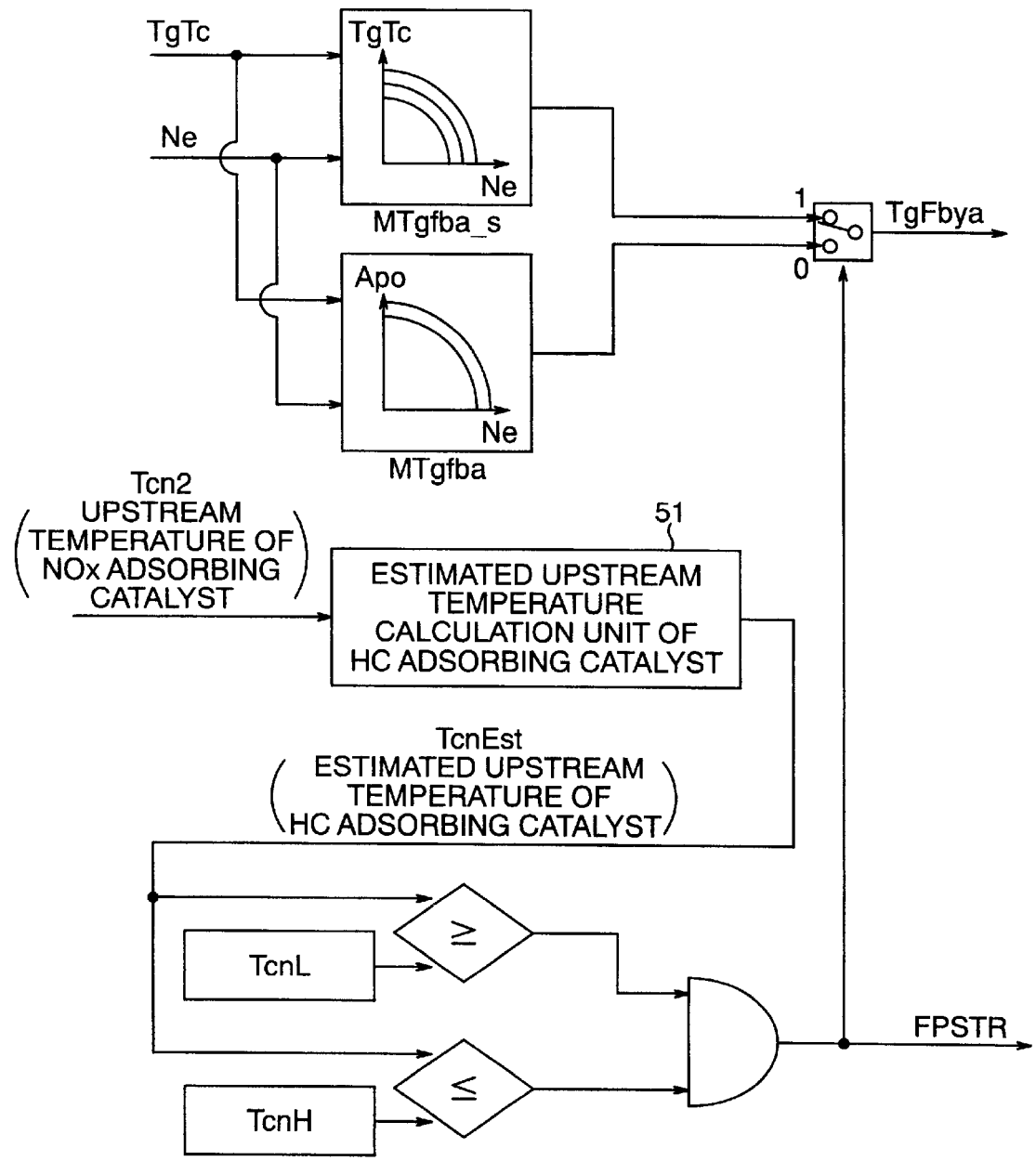
FIG. 26 is a diagram illustrating a target equivalent ratio calculation unit.

A target equivalent ratio calculation unit 43 is shown in FIG. 26, which is designed to decide a state of combustion, and calculate a target equivalent ratio.

A code FPSTR represents a stratified charge permission flag, and an injection timing, an ignition timing, an injection quantity, and an air quantity are controlled in such a way as to perform stratified charge combustion with FPSRT=1.

Specifically, for the FPSTR, a stratified charge permission flag FPSTR=1 is set with TcnEst≧TcnL, and TcnEst≦TcnH. Other than this, FPSTR=0 is set. Here, TcnEst represents an estimated upstream temperature of an HC adsorbing catalyst; and Tcn2 a real upstream temperature of an $NO_x$ adsorbing (occluding) catalyst. In this case, TcnEst is estimated from Tcn2, and this will be described later.

Here, preferably, TcnL should be set to a temperature for starting elimination of adsorbed HC in the HC adsorbing catalyst, generally in a range of 100° C. to 200° C. depending on a position of the sensor.

TcnH should preferably be set to an activation temperature of a three-way catalyst in the HC adsorbing catalyst, in a range of 250° C. to 400° C. depending on catalyst performance.

Preferably, TcnL2 and TcnH2 should be set in a temperature zone for causing the $NO_x$ catalyst to exhibit adsorption (occlusion) performance. Depending on catalyst performance, TcnL2 is set around 300° C.; and TcnH2 around 400° C.

At stratified charge combustion permission time, for a target equivalent ratio map Mtgfba_s for stratified charge combustion, a value referenced from target combustion pressure torque TgTc and a speed Ne is set as a target equivalent ratio TgFbya.

With TgFbya=0, homogenous charge combustion is performed and, for a target equivalent ratio map Mtgfba for a homogenous charge combustion, a value referenced from the target combustion pressure torque TgTc and the speed Ne is set as a target equivalent ratio TgFbya.

Preferably, set values of a target equivalent ratio map Mtgfba_s for stratified charge combustion, and a target equivalent ratio map Mtgfba for homogenous combustion should be decided based on experiment data by the real machine.

In the embodiment, the stratified charge permission depends only on the temperature of the HC adsorbing catalyst temperature. For the purpose of improving fuel economy, however, stratified charge permission may be set by separately determining a driving area to be charged in a stratified manner.

For example, specifications may be added where for the FPSTR, if values of a water temperature Twn, an accelerator opening Apo, and an engine speed Ne satisfy given conditions, FPSTR=1 is set to permit stratified charge combustion.

The target equivalent ratio calculation unit 43 includes an HC adsorbing catalyst estimated upstream temperature calculation unit 51, which is provided to estimate a temperature by the following method.

Figure 27:
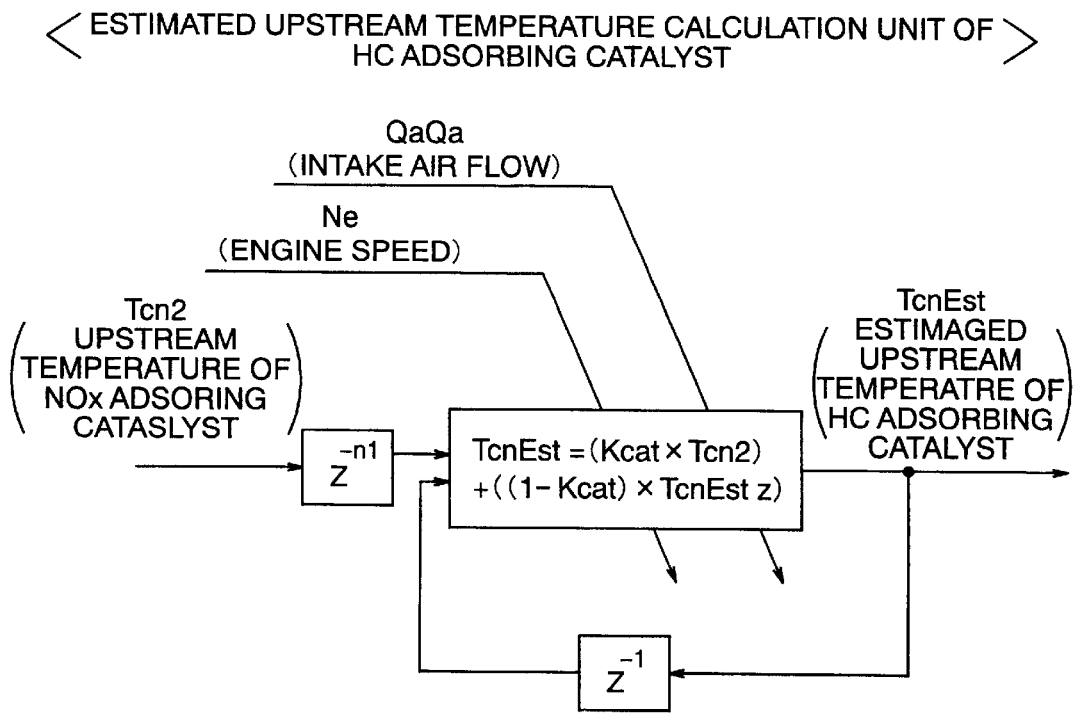
FIG. 27 is a diagram illustrating an HC adsorbing catalyst temperature estimation unit.

As shown in FIG. 27, an upstream temperature TcnEst of the HC adsorbing catalyst is estimated from an upstream temperature Tcn2 of the $NO_x$ adsorbing (occluding) catalyst, and a temperature transmission characteristic from the upstream side of $NO_x$ adsorbing (occluding) catalyst to the upstream side of the HC adsorbing catalyst is approximated by Dead Time+First-order Lag System.

Set values of a parameter n1 representing the dead time, and a time constant equivalent parameter Kcat of a first-order lag system should preferably be set from experiment data by the real machine. These parameters may be changed by various driving conditions including, for example an intake air flow quantity QA, an engine speed Ne, and the like.

Fourth Embodiment

According to the embodiment, second fuel injection is carried out in an expansion stroke in order to increase temperatures of an $NO_x$ adsorbing (occluding) catalyst and an HC adsorbing catalyst, fuel is subjected to oxidation reaction in a cylinder, an exhaust gas pipe, and the catalysts and, by its reaction heat, the temperatures of the catalysts are increased.

Figure 28:
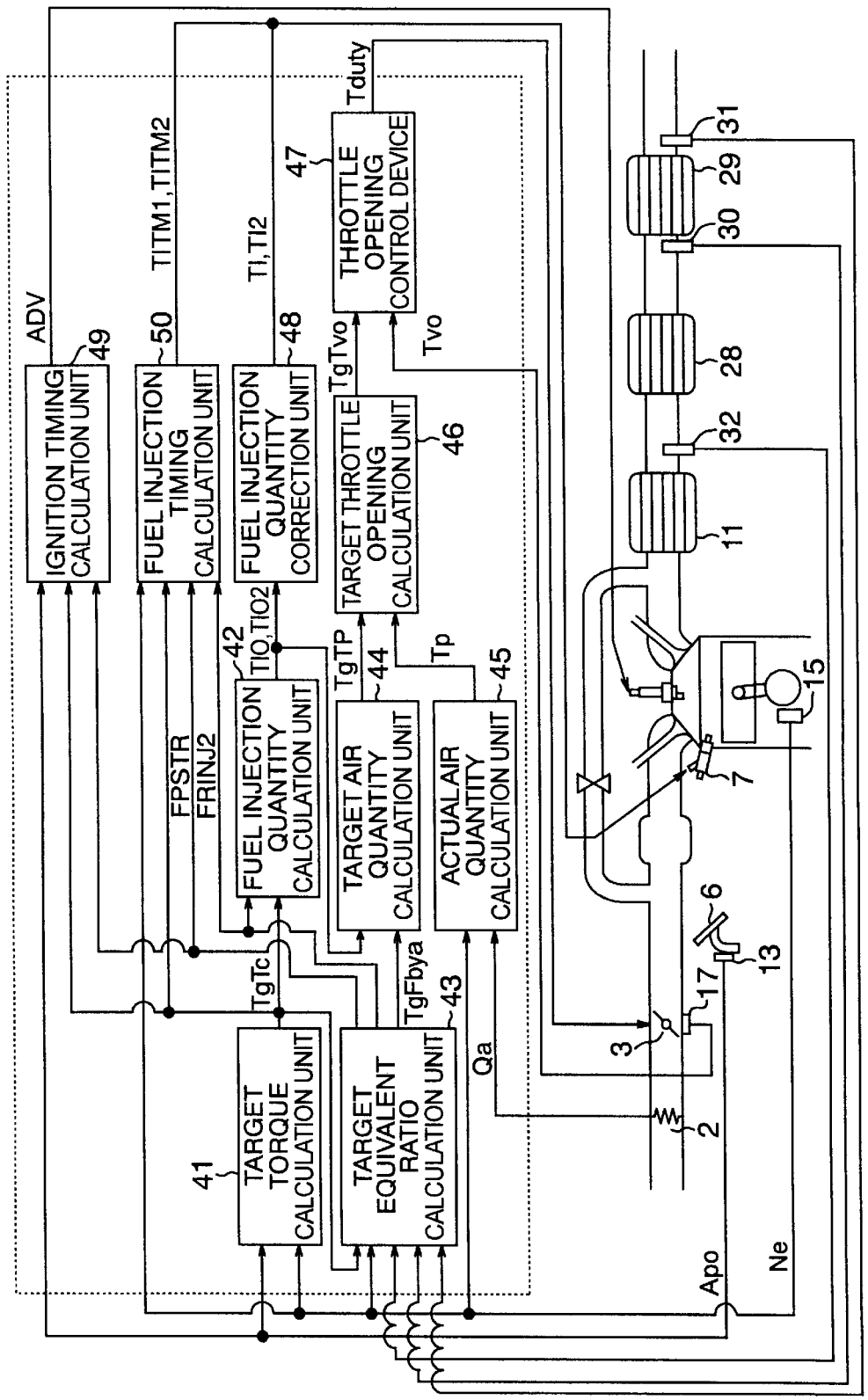
FIG. 28 is a control block diagram showing an engine control system according to yet another embodiment of the invention.

FIG. 28 is a control block diagram. Calculation of a second-injection permission flag FPINJ2 for increasing catalyst temperatures is added at the target equivalent ratio calculation unit in the block diagram of the second embodiment. A result of calculation is entered to a fuel injection time calculation unit, a fuel injection quantity correction unit, and a fuel injection quantity calculation unit. Thus, portions similar to those of the second embodiment will be omitted. Hereinafter, detailed description is made of specific control blocks. In this case, the control system also includes a target torque calculation unit 41, a target air quantity calculation unit 44, an actual air quantity calculation unit 45, a target throttle opening calculation unit 46, a throttle opening control device 47, an ignition timing calculation unit 49, and a fuel injection timing calculation unit 50. These units are all similar to those of the first embodiment, and thus description thereof will be omitted.

The fuel injection quantity calculation unit 42 is shown in FIG. 29, which is designed to calculate a second fuel injection quantity TI02 carried out in an expansion stroke. Specifically, with FPINJ2=1, a second fuel injection quantity TI02=KTI02 is set, and TI02=0 is set with FPINJ2=0. FPINJ2 is calculated at the target equivalent quantity calculation unit, and this will be described alter.

Preferably, KTI02 should be decided in such a way as to obtain a maximum temperature increasing effect of a catalyst with later-described KTITM2. However, consideration must be given to a total exhaust air-fuel ratio.

Figure 30:
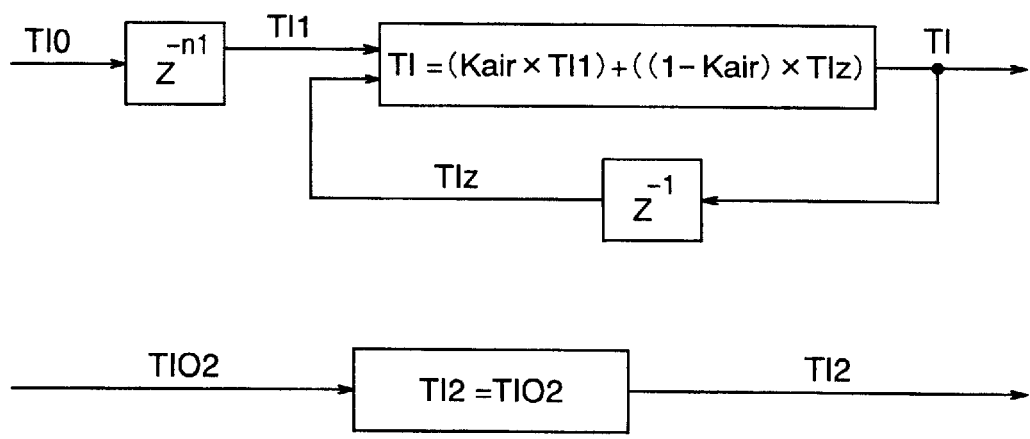
FIG. 30 is a diagram illustrating a fuel injection quantity correction unit.

The fuel injection quantity correction unit 48 is shown in FIG. 30, which is designed to correct the second fuel injection quantity TI02 in an expansion stroke. TI02 is set at TI2=TI01 irrespective of phase correction.

In this case, matching with a phase of air is not executed. However, to control an exhaust air-fuel ratio more accurately, preferably, the second fuel target injection quantity TI2 should also be matched with a phase of air.

Figure 31:
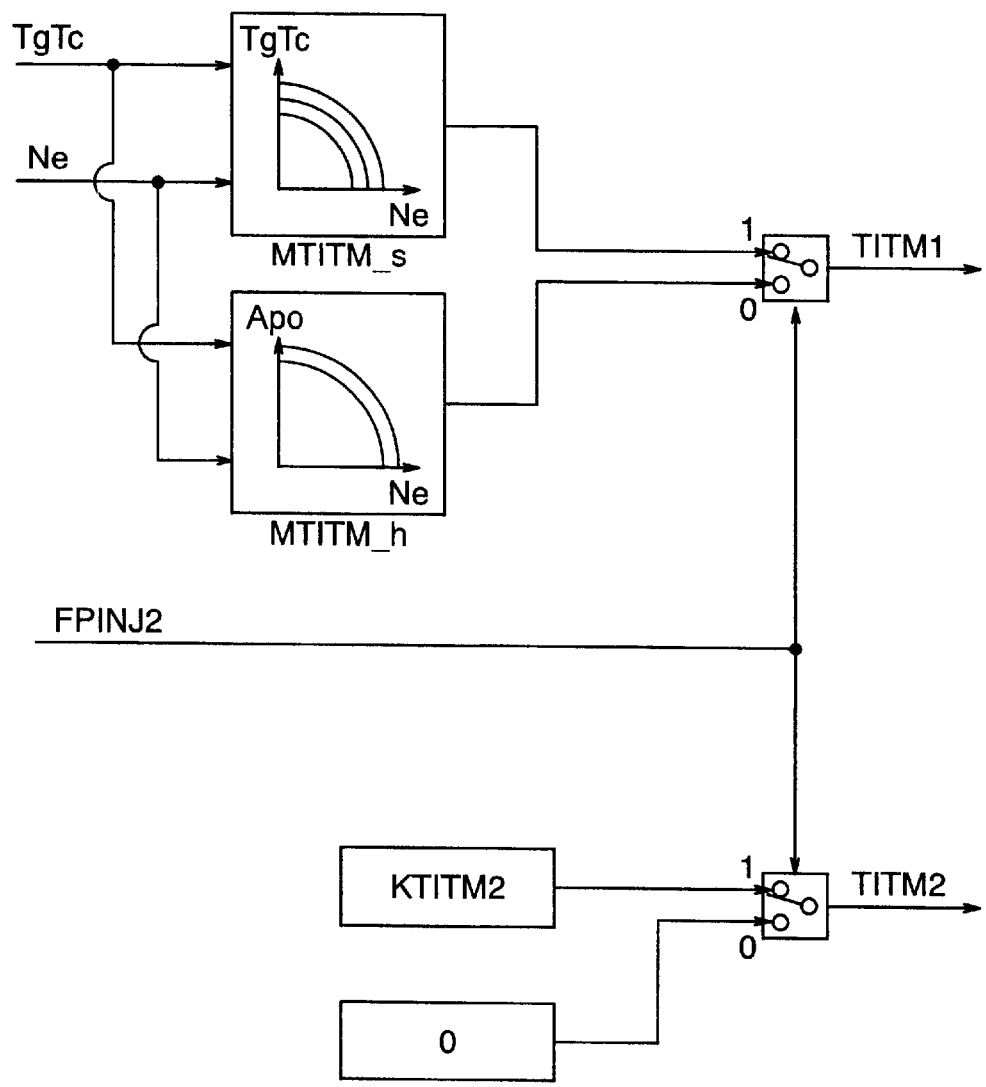
FIG. 31 is a diagram illustrating a fuel injection timing calculation unit.

The fuel injection time calculation unit 48 is shown in FIG. 31, which is designed to calculate injection time TITM2 of second injection carried out in the expansion stroke.

Specifically, with FPINJ2=1, TITM2=KTITM2 is set and, preferably, KTITM2 should be set in such a way as to obtain a maximum temperature increasing effect of the catalyst with the above-described KTI02.

Figure 32:
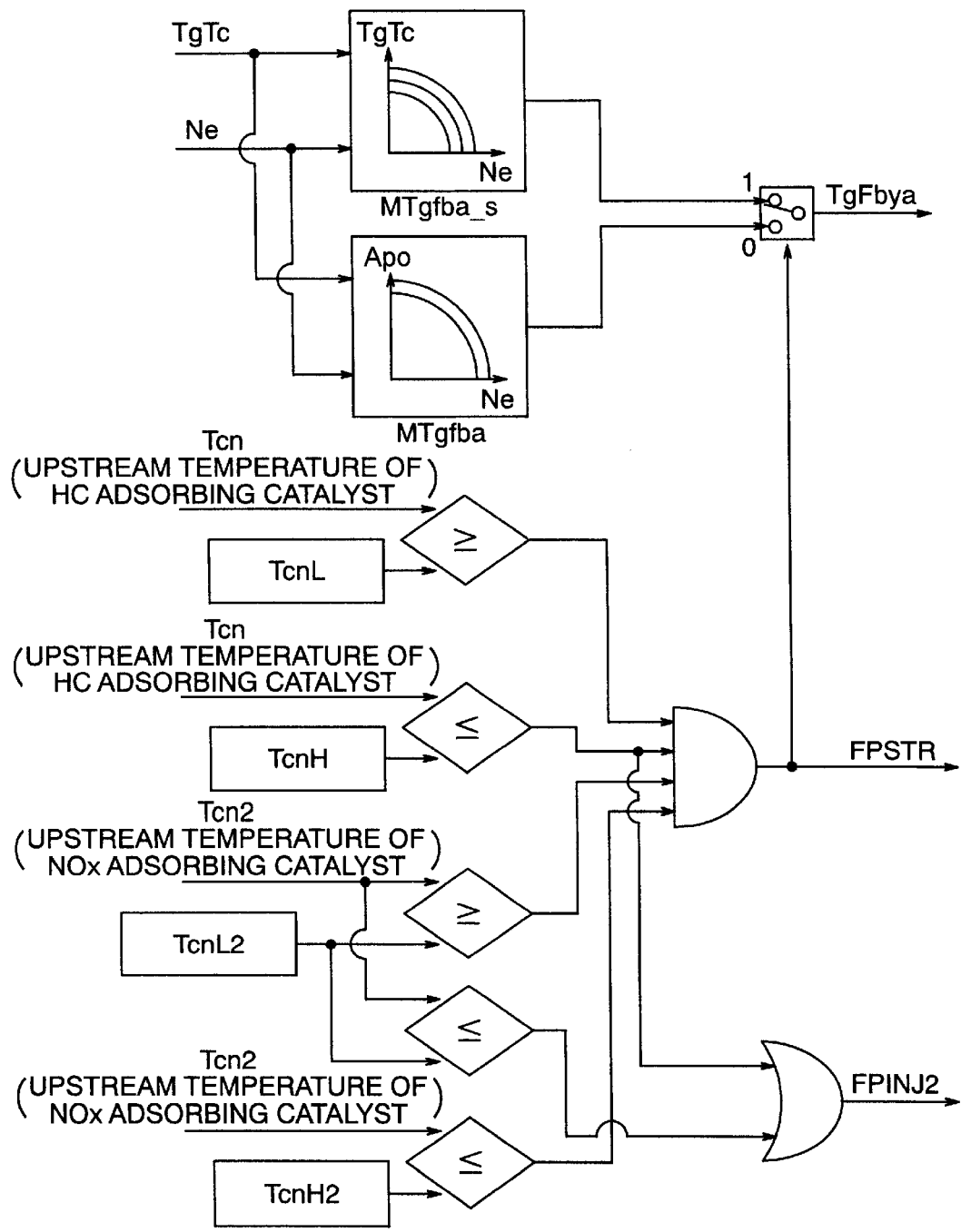
FIG. 32 is a diagram illustrating a target equivalent ratio calculation unit.

The target equivalent ratio calculation unit 43 is shown in FIG. 32, which is designed to decide a state of combustion, and calculate a target equivalent ratio.

A code FPSTR represents a stratified charge combustion permission flag, and an injection timing, an ignition timing, an injection quantity, and an air quantity are controlled in such a way as to perform stratified charge combustion with FPSTR=1.

Specifically, for the FPSTR, a stratified charge permission flag FPSTR=1 is set with Tcn≧TcnL, Tcn≦TcnH, Tcn2≧TcnL2, and Tcn2≦TcnH2. Other than this, FPSTR=0 is set. A code Tcn represents an upstream temperature of an HC adsorbing catalyst; and Tcn2 an upstream temperature of an $NO_x$ adsorbing (occluding) catalyst.

Here, preferably, TcnL should be set to a temperature for starting elimination of adsorbed HC in the HC adsorbing catalyst, generally in a range of 100° C. to 200° C. depending on a position of the sensor. TcnH should preferably be set to an activation temperature of a three-way catalyst in the HC adsorbing catalyst, in a range of 250° C. to 400° C. depending on catalyst performance.

Preferably, TcnL2 and TcnH2 should be set in a temperature zone for causing the $NO_x$ catalyst to exhibit adsorption (occlusion) performance. Depending on catalyst performance, TcnL2 is set around 300° C.; and TcnH2 around 400° C.

At stratified charge combustion permission time, for a target equivalent ratio map Mtgfba_s for stratified charge combustion, a value referenced from target combustion pressure torque TgTc and a speed Ne is set as a target equivalent ratio TgFbya.

With TgFbya=0, homogenous charge combustion is performed and, for a target equivalent ratio map Mtgfba for a homogenous charge combustion, a value referenced from the target combustion pressure torque TgTc and the speed Ne is set as a target equivalent ratio TgFbya.

Preferably, set values of a target equivalent ratio map Mtgfba_s for stratified charge combustion, and a target equivalent ratio map Mtgfba for homogenous combustion should be decided based on experiment data by a real machine.

A second injection permission flag FPINJ2 is also calculated. Specifically, for the FPINJ2, FPINJ2=1 is set with Tcn≦TcnH or Tcn2≦TcnL2 and, other than this, FPINJ2=0 is set.

As described above, TcnH represents an activation temperature of the three-way catalyst in the HC adsorbing catalyst; and TcnL2 an activation catalyst of the $NO_x$ adsorbing (occluding) catalyst. Until both catalysts reach the activation temperatures, temperature increase control by twice injections are performed.

In the embodiment, the stratified charge permission depends only on the temperature of the HC adsorbing catalyst temperature. For the purpose of improving fuel economy, however, stratified charge permission may be set by separately determining a driving area to be charged in a stratified manner.

For example, specifications may be added where for the FPSTR, if values of a water temperature Twn, an accelerator opening Apo, and an engine speed Ne satisfy given conditions, FPSTR=1 is set to permit stratified charge combustion.

Fifth Embodiment

According to the embodiment, when elimination of HC adsorbed by an HC adsorbing catalyst is started, exhaust gas on the downstream side of the HC adsorbing catalyst is circulated through the upstream side of an $NO_x$ adsorbing (occluding) catalyst, and both HC and $NO_x$ are controlled by the $NO_x$ adsorbing (occluding) catalyst.

Figure 33:
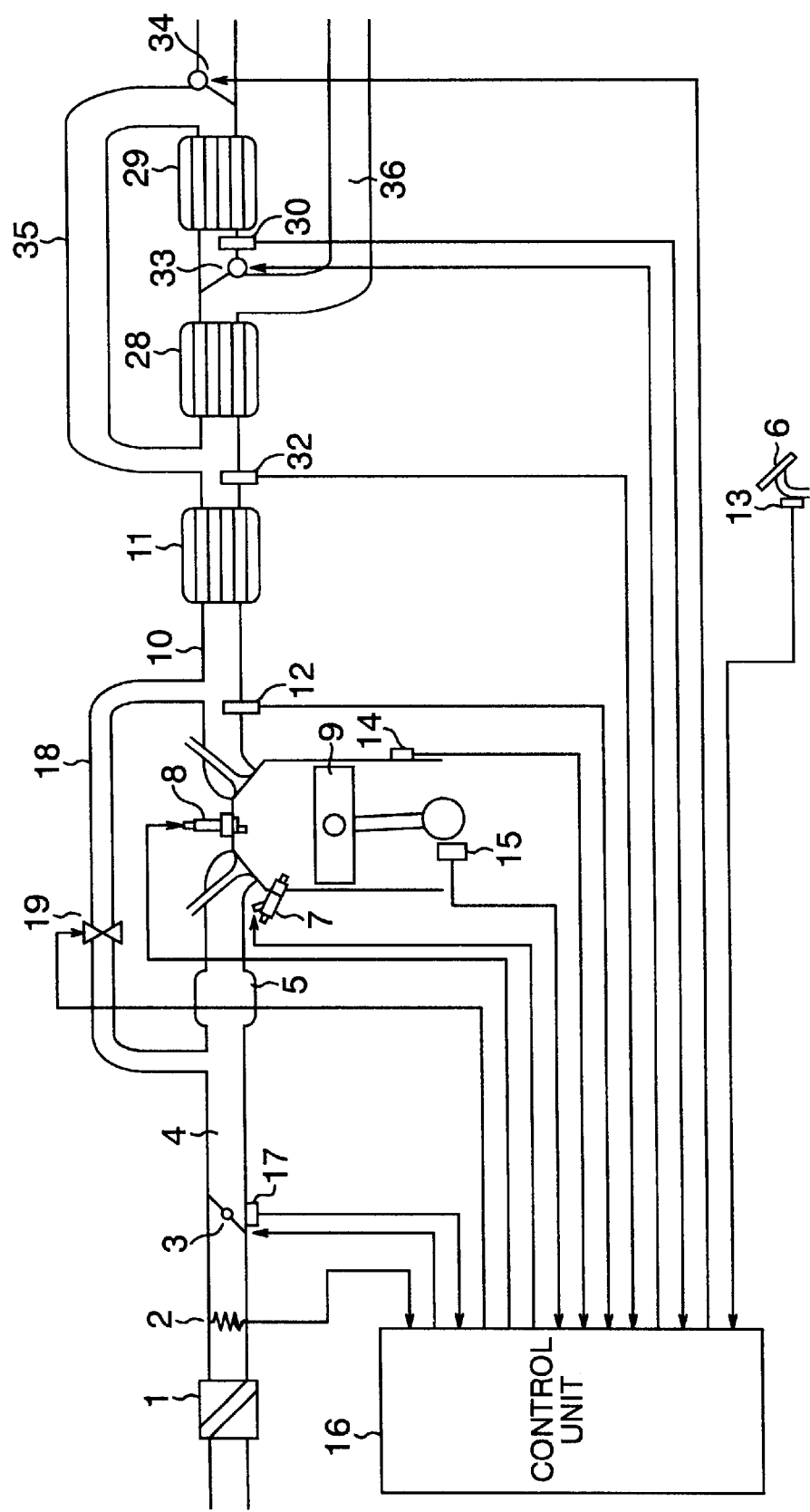
FIG. 33 is a diagram showing an engine control system according to yet another embodiment of the invention.

FIG. 33 is a view of an engine control system. In the system of the second embodiment (FIG. 20), an exhaust gas circulating pipe 35 is provided to circulate exhaust gas from the downstream side of the HC adsorbing catalyst to the upstream side of the $NO_x$ adsorbing (occluding) catalyst 28. Also, a bypass pipe 36 is provided on the downstream side of the $NO_x$ adsorbing (occluding) catalyst 28 to discharge exhaust gas directly to atmosphere differently from a flowing direction of the HC adsorbing catalyst 29.

At respective flow division points of the exhaust gas circulating pipe 35 and the bypass pipe 36, exhaust gas switching valves 33 and 34 are provided. Other systems are similar to those of the second embodiment, and thus description thereof will be omitted.

Figure 34:
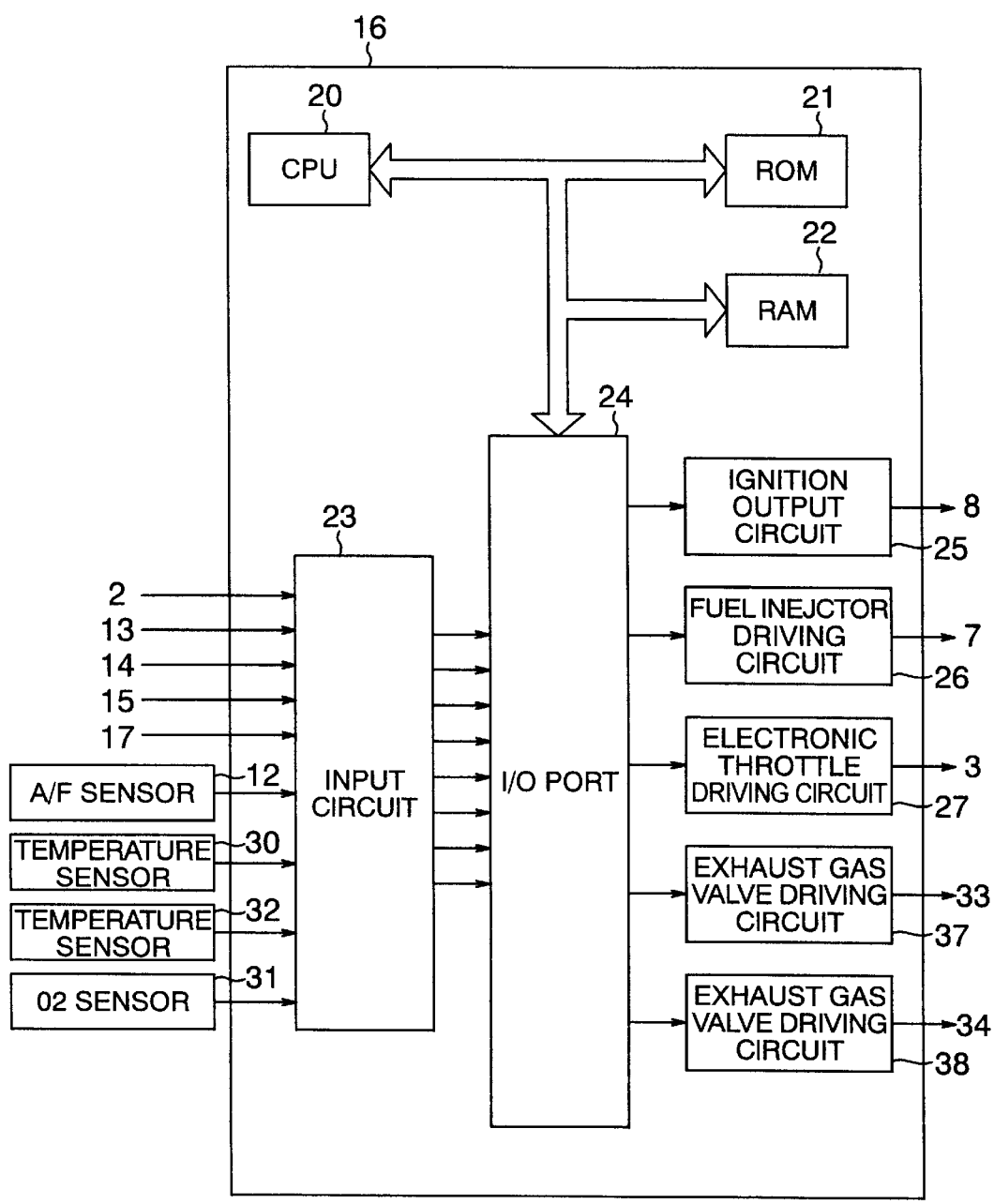
FIG. 34 is a diagram illustrating an inside portion of a control device.

FIG. 34 shows an inside portion of a control device 16. Portions other than exhaust gas valve driving circuits 37 and 38 additionally provided are similar to those of the second embodiment, and thus description thereof will be omitted.

Figure 35:
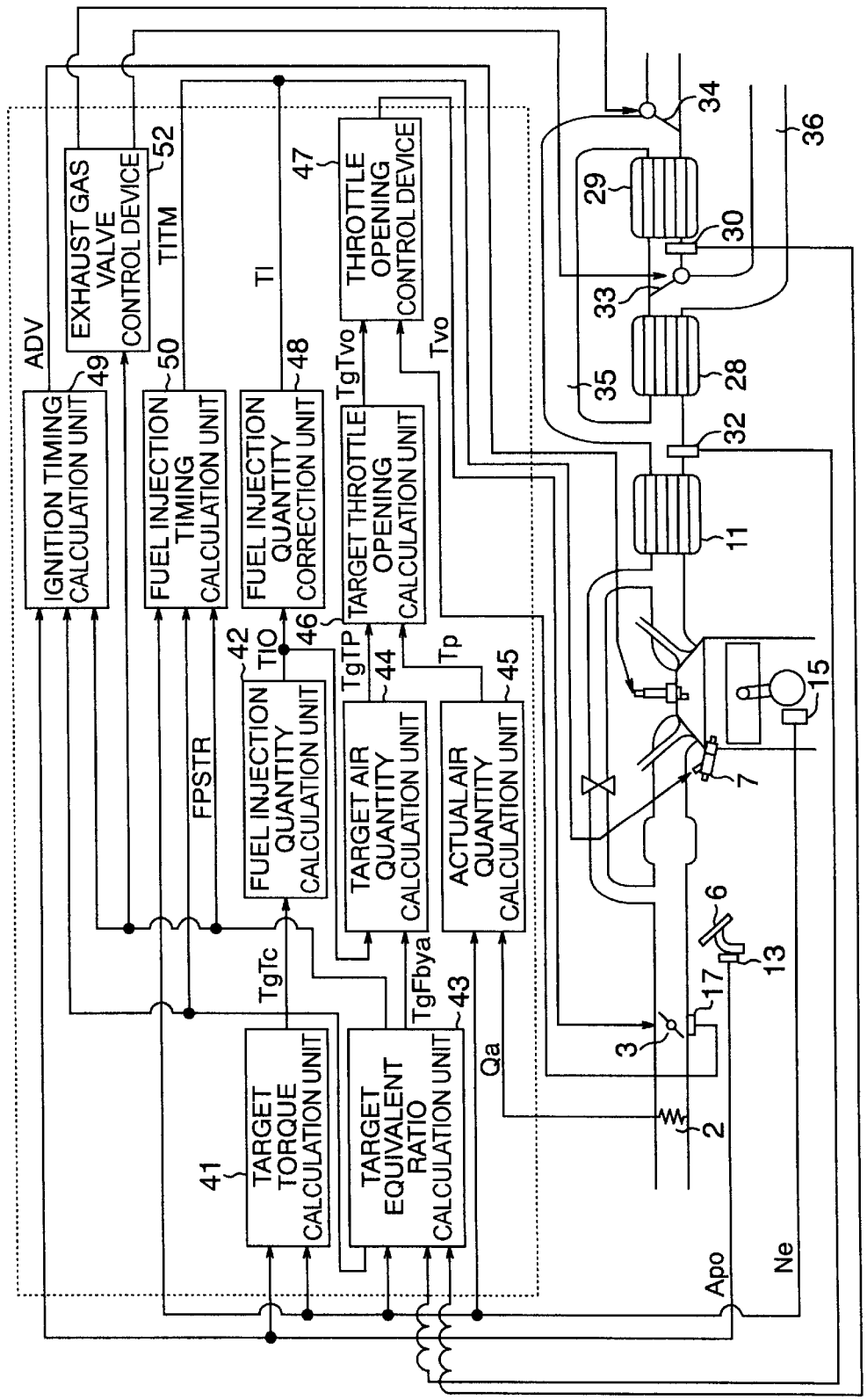
FIG. 35 is a control block diagram of the embodiment shown in FIG. 33.
Figure 36:
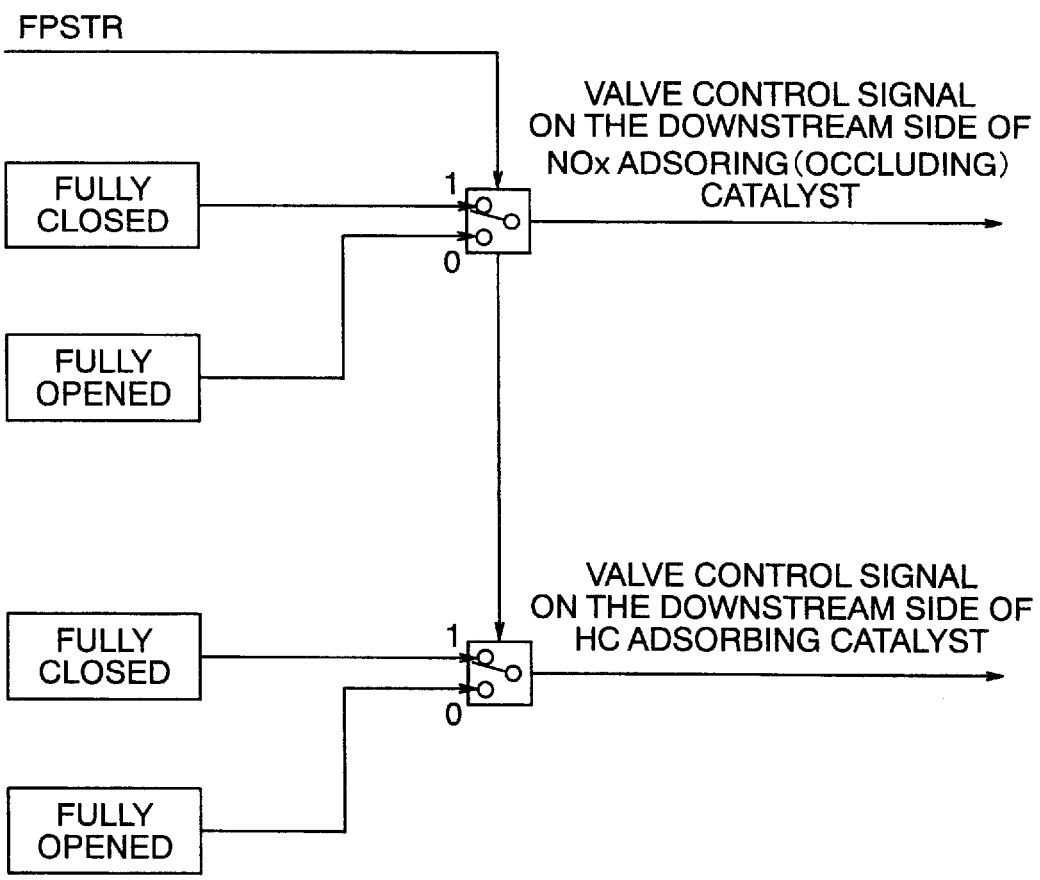
FIG. 36 is a diagram illustrating an exhaust valve control device.

FIG. 35 is a block diagram of a control system. In the block diagram of the fourth embodiment, the exhaust gas circulating pipe 35, the bypass pipe 36, the exhaust gas switching valves 33 and 34, and an exhaust gas valve control device 52 are additionally provided. Other portions are similar to those of the fourth embodiment, and thus description thereof will be omitted.

Hereinafter, detailed description is made of specific control blocks. In this case, the control system also includes a target torque calculation unit, a fuel injection quantity calculation unit, an fuel injection quantity correction unit, a target air quantity calculation unit, an actual air quantity calculation unit, a target throttle opening calculation unit, a throttle opening control device, a target equivalent ratio calculation unit, an ignition timing calculation unit, and a fuel injection timing calculation unit. These units are all similar to those of the previous embodiment, and thus description thereof will be omitted.

The exhaust gas valve control device 52 is shown in FIGL 36, which is designed to control opening/closing of the exhaust gas switching valves 33 and 34 on the downstream side of the $NO_x$ adsorbing (occluding) catalyst 28 and the HC adsorbing catalyst 29 in accordance with temperatures of the catalysts.

Specifically, with a stratified charge FPSTR=0, the exhaust gas switching valve 34 on the downstream side of the HC adsorbing catalyst 29 is substantially opened, and exhaust gas flowing through the HC adsorbing catalyst 29 is not circulated to an upstream side o the $NO_x$ adsorbing (occluding) catalyst 28. The exhaust gas switching valve 33 on the downstream side of the $NO_x$ adsorbing (occluding) catalyst 28 is also opened, and controlled to cause exhaust gas to flow to the HC adsorbing catalyst 29. These operations are at normal starting time or the like and, in this case, HC is adsorbed by the HC adsorbing catalyst 29.

On the other hand, with a stratified charge permission flag FPSTR=1, the exhaust gas switching valve 34 on the downstream side of the HC adsorbing catalyst 29 is substantially closed, and exhaust gas having been subjected to elimination and control at the HC adsorbing catalyst 29 can be circulated to the upstream side of the $NO_x$ adsorbing (occluding) catalyst 28. In addition, the exhaust gas switching valve 33 on the downstream side of the $NO_x$ adsorbing (occluding) catalyst 28 is properly controlled for its opening to cause exhaust gas to flow to the HC adsorbing catalyst 29 and to the atmosphere. Thus, HC remaining in the circulated exhaust gas is further controlled by a three-way purifying function of the $NO_x$ adsorbing (occluding) catalyst 28.

In this case, in order to facilitate efficient circulation of the exhaust gas of the HC adsorbing catalyst 29, the exhaust gas switching valve 33 on the downstream side of the $NO_x$ adsorbing (occluding) catalyst is designed to be optimal such that a highly efficient control effect can be obtained.

Figure 37:
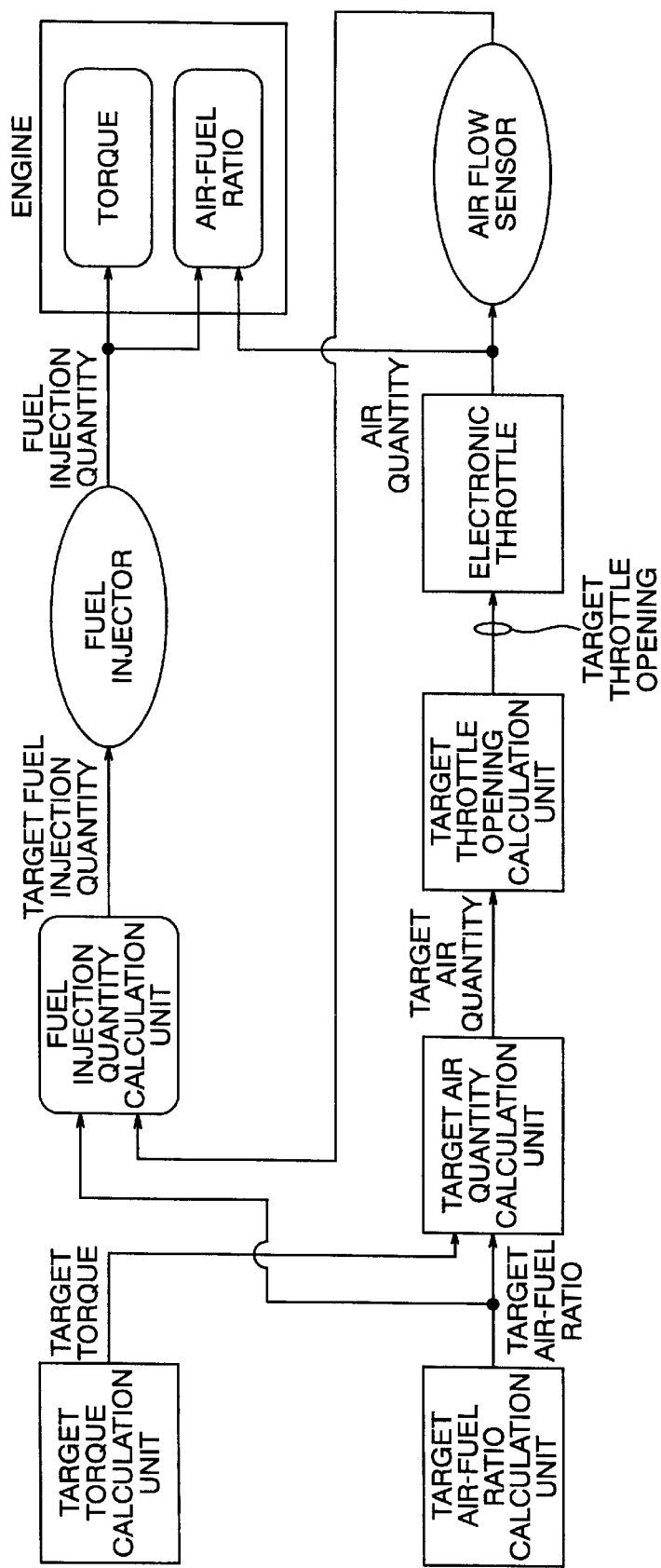
FIG. 37 is a diagram illustrating a basic configuration of an air leading type torque demand control system.

The fuel leading type torque demand control has been employed in the foregoing and, needless to say, the invention can be similarly executed by an air leading type torque demand control system, for example a mode shown in FIG. 37. This air leading type torque demand control system itself is well known, and thus detailed explanation thereof is not necessary.

As apparent from the foregoing, according to the embodiments of the present invention are advantageous in the following respects.

(1) Because of its characteristics, the HC adsorbing catalyst adsorbs GC at a certain temperature or lower (generally in a range of 100 to 150° C.), and elimination of the HC is started at a temperature higher than the above. Thus, control efficiency can be increased by monitoring a temperature of the HC adsorbing catalyst to detect HC elimination, and controlling an air-fuel ratio to a lean side so as to supply oxygen enough to control the HC.

(2) The $NO_x$ adsorbing (occluding) catalyst is provided, because $NO_x$ cannot be controlled by a three-way catalyst in a lean state. As this catalyst has a temperature characteristic, $NO_x$ control efficiency can be increased by controlling a quantity of lean shifting in accordance with its temperature.

(3) Inlet oxygen concentration of the HC adsorbing catalyst, i.e., an air-fuel ratio of the engine is controlled so as to prevent a reduction in oxygen on the downstream side caused by presence of a catalyst having a three-way purifying function located on the upstream side of the HC adsorbing catalyst. Thus, control efficiency of HC to be eliminated from the HC adsorbing catalyst can be increased.

(4) Oxygen is supplied by lean control until HC elimination is completed and, by detecting the completion of the HC elimination, the adsorbed HC can be thoroughly controlled highly efficiently.

(5) $NO_x$ control efficiency can be increased by disposing the $NO_x$ adsorbing (occluding) catalyst on the upstream side of the HC adsorbing catalyst, and increasing an activating speed of the $NO_x$ adsorbing (occluding) catalyst.

(6) Lean shifting driving is carried out when temperatures of the HC adsorbing catalyst C and the $NO_x$ adsorbing (occluding) catalyst B are equal to/higher than predetermined values. Thus, the $NO_x$ adsorbing (occluding) catalyst is sufficiently activated, making it possible to increase $NO_x$ control efficiency.

(7) The HC adsorbing catalyst C and the $NO_x$ adsorbing (occluding) catalyst B have activation temperature characteristics different from each other. Thus, an early effect and an control efficiency increase can be expected by rapidly heating the catalysts to corresponding temperatures.

(8) Gas containing eliminated HC is circulated again from the downstream side of the HC adsorbing catalyst through the circulating pipe to the upstream side of the $NO_x$ adsorbing (occluding) catalyst, controlled in the $NO_x$ adsorbing catalyst, and then discharged through the bypass pipe to the atmosphere. Thus, uncontrolled HC can be greatly reduced.

According to the present invention, it is possible to efficiently control HC at a starting time without losing both $NO_x$ control efficiency and engine driving stability.

It should be further understood by those skilled in the art that the foregoing description has been made on embodiments of the invention and that various changes and modifications may be made in the invention without departing from the spirit of the invention and scope of the appended claims.

What is claimed is:

1. A control method of an engine, having at least an HC adsorbing catalyst including an HC adsorbing function for adsorbing HC in an exhaust gas pipe of the engine at a low temperature and for emitting the adsorbed HC at a high temperature, and a three-way purifying function on the same carrier; and an $NO_x$ adsorbing (occluding) catalyst having an $NO_x$ adsorbing (occluding) function for adsorbing or occluding $NO_x$ in oxidizing atmosphere and for emitting $NO_x$ in reducing atmosphere, and a three-way purifying function, said method comprising the steps of:

driving the engine in a stoichiometric air-fuel ratio or a rich air-fuel ratio when a temperature of the HC adsorbing catalyst and a temperature of the $NO_x$ adsorbing (occluding) catalyst is equal to/lower than a predetermined value; and driving the engine in a lean air-fuel ratio when the temperature of the HC adsorbing catalyst and a temperature of the $NO_x$ adsorbing (occluding) catalyst is equal to/higher than the predetermined value.

2. The control method of an engine according to claim 1, wherein when the temperature of the HC adsorbing catalyst is equal to/higher than the predetermined value, the air-fuel ratio of the engine is changed from the stoichiometric or the rich air-fuel ratio to the lean air-fuel ratio in a switching or gradual manner.

3. The control method of an engine according to claim 1, wherein when the temperature of the HC adsorbing catalyst is equal to/higher than the predetermined value, the air-fuel ratio is controlled to the lean air-fuel ratio in accordance with the temperature of the $NO_x$ adsorbing (occluding) catalyst.

4. The control method of an engine according to claim 1, wherein when the temperature of the HC adsorbing catalyst is equal to/higher than the predetermined value, the air-fuel ratio is controlled so that inlet oxygen concentrations of the HC adsorbing catalyst and the $NO_x$ adsorbing (occluding) catalyst are equal to/higher than the predetermined values, respectively.

5. A control method of an engine according to claim 1, wherein when the temperature of the HC adsorbing catalyst is equal to/higher than the predetermined value and until the removal of the adsorbed HC from the HC adsorbing catalyst is completed, the air-fuel ratio is controlled so as to be at least the lean air-fuel ratio.

6. A control method of an engine according to claim 1, wherein when the temperature of the HC adsorbing catalyst is equal to/higher than the predetermined value and when the temperature of the $NO_x$ catalyst is equal to/higher than the predetermined value, the air-fuel ratio is changed from the stoichiometric air-fuel ratio or the rich air-fuel ratio to the lean air-fuel ratio.

7. A control device of an engine capable of combustion in a lean air-fuel ratio, comprising:

an HC adsorbing catalyst having an HC adsorbing function for adsorbing HC in an exhaust gas pipe of the engine at a low temperature and for emitting the adsorbed HC at a high temperature, and a three-way purifying function on the same carrier;

an $NO_x$ adsorbing (occluding) catalyst having an $NO_x$ adsorbing (occluding) function for adsorbing or occluding $NO_x$ in oxidizing atmosphere and for emitting $NO_x$ in reducing atmosphere, and a three-way purifying function on the same carrier; and means for directly or indirectly detecting a temperature of the HC adsorbing catalyst and a temperature of the $NO_x$ adsorbing (occluding) catalyst; and means for controlling said engine such that driving state of said engine is controlled in accordance with the temperature of the HC adsorbing catalyst and the temperature of the $NO_x$ adsorbing (occluding) catalyst.

8. The control device of the engine according to claim 7, wherein when the temperature of the HC adsorbing catalyst is equal to/higher than a predetermined value, fuel injected from a fuel injector is adjusted to control the air-fuel ratio of a mixture supplied to the engine from a stoichiometric air-fuel ratio or a stoichiometric air-fuel ratio to a lean air-fuel ratio.

9. The control device of the engine according to claim 8, wherein in a state which is controlled to the lean air-fuel ratio, the fuel injected from the fuel injector is adjusted to decide the air-fuel ratio in accordance with the temperature of the $NO_x$ adsorbing (occluding) catalyst.

10. The control device of the engine according to claim 7, further comprising means for directly or indirectly detecting the completion of elimination/removal of the adsorbed HC from the HC adsorbing catalyst, wherein when the temperature of the HC adsorbing catalyst is equal to/higher than a predetermined value and until the elimination/removal of the adsorbed HC is completed, the fuel injected from the fuel injector is adjusted so that the air-fuel ratio is at least in a lean state.

11. The control device of an engine according to claim 7, wherein the HC adsorbing catalyst is disposed on the downstream side of the $NO_x$ adsorbing (occluding) catalyst.

12. The control device of an engine according to claim 7, wherein when the temperature of the HC adsorbing catalyst is equal to/higher than a predetermined value and when the temperature of the $NO_x$ catalyst is equal to/higher than a predetermined value, the fuel injected from the fuel injector is adjusted so that the air-fuel ratio is in a lean state.

13. A control device of an engine according to claim 7, further comprising catalyst temperature control means, wherein the temperatures of the HC adsorbing catalyst C and the $NO_x$ adsorbing catalyst are controlled by the catalyst temperature control means.

14. A control device of an engine according to claim 13, wherein the catalyst temperature control means controls the temperatures of the catalysts with oxidation reaction heat of unburned HC in a cylinder, an exhaust gas pipe or the catalysts by injecting fuel in an expansion stroke of the engine.

15. A control device of an engine according to claim 7, wherein the HC adsorbing catalyst is disposed on the downstream side of the $NO_x$ adsorbing (occluding) catalyst; and said control device further comprising a circulating pipe provided to circulate exhaust gas from the downstream side of the HC adsorbing catalyst to the upstream side of the $NO_x$ adsorbing (occluding) catalyst, a bypass pipe provided on the downstream side of the $NO_x$ adsorbing (occluding) catalyst to discharge exhaust gas directly to the atmosphere via no HC adsorbing catalyst, an exhaust gas pipe provided at a division point of the circulating pipe and the bypass pipe to control the flow of exhaust gas, and a control device provided to control the exhaust gas value based on catalyst temperatures.

16. A control device of an engine capable of combustion in a lean air-fuel ratio, comprising:

an $NO_x$ adsorbing catalyst disposed in an exhaust system of said engine and having an $NO_x$ adsorbing function for adsorbing $NO_x$ in oxidizing atmosphere and for emitting $NO_x$ in reducing atmosphere and a three-way purifying function on the same carrier;

an HC adsorbing catalyst disposed after said $NO_x$ adsorbing catalyst having an HC adsorbing function for adsorbing HC in an exhaust gas pipe of the engine at a low temperature and for emitting the adsorbed HC at a high temperature and a three-way purifying function on the same carries; and means for directly or indirectly detecting a temperature at an outlet of the $NO_x$ adsorbing catalyst; and means for controlling a engine control parameter in accordance with the detected temperature at the outlet of said $NO_x$ adsorbing catalyst, wherein said engine control parameter includes an air-fuel ratio of a mixture into said engine, when a temperature at an outlet of the $NO_x$ adsorbing catalyst is equal to/lower than a predetermined value, said controlling means controls said engine to be operated in a stoichiometric air-fuel ratio or a rich air-fuel ratio; and when a temperature of the outlet of said $NO_x$ adsorbing catalyst is equal to/higher than the predetermined value, said controlling means controls said engine to be operated in a lean air-fuel ratio.

17. A control device controlling an engine having an $NO_x$ adsorbing catalyst disposed in an exhaust system of said engine and having an $NO_x$ adsorbing function for adsorbing $NO_x$ in oxidizing atmosphere and for emitting $NO_x$ in reducing atmosphere and a three-way purifying function on the same carrier, and an HC adsorbing catalyst disposed after said $NO_x$ adsorbing catalyst having an HC adsorbing function for adsorbing HC in an exhaust gas pipe of the engine at a low temperature and for emitting the adsorbed HC at a high temperature and a three-way purifying function on the same carrier, said device comprising:

means for directly or indirectly detecting a temperature at an outlet of the $NO_x$ adsorbing catalyst; and means for controlling a engine control parameter in accordance with the detected temperature at the outlet of said $NO_x$ adsorbing catalyst, wherein said engine control parameter includes an air-fuel ratio of a mixture into said engine, when a temperature at an outlet of the $NO_x$ adsorbing catalyst is equal to/lower than a predetermined value, said controlling means controls said engine to be operated in a stoichiometric air-fuel ratio or a rich air-fuel ratio; and when temperature of the outlet of said $NO_x$ adsorbing catalyst is equal to/higher than the predetermined value, said controlling means controls said engine to be operated in a lean air-fuel ratio.

* * * * *